July 28, 1959 E. H. GATZERT ET AL 2,897,272

COIN CONTROL TELEPHONE SYSTEM

Filed July 26, 1955 15 Sheets-Sheet 1

INVENTORS.
ERNEST H. GATZERT
WILLIAM W. PHARIS
BY
ATTORNEY

July 28, 1959 E. H. GATZERT ET AL 2,897,272

COIN CONTROL TELEPHONE SYSTEM

Filed July 26, 1955 15 Sheets-Sheet 3

July 28, 1959 E. H. GATZERT ET AL 2,897,272

COIN CONTROL TELEPHONE SYSTEM

Filed July 26, 1955 15 Sheets-Sheet 5

July 28, 1959 E. H. GATZERT ET AL 2,897,272

COIN CONTROL TELEPHONE SYSTEM

Filed July 26, 1955 15 Sheets-Sheet 6

TWO WAY TRUNK CIRCUIT 19

July 28, 1959 E. H. GATZERT ET AL 2,897,272

COIN CONTROL TELEPHONE SYSTEM

Filed July 26, 1955 15 Sheets-Sheet 12

TWO WAY TRUNK CIRCUIT 19

United States Patent Office 2,897,272

Patented July 28, 1959

2,897,272

COIN CONTROL TELEPHONE SYSTEM

Ernest H. Gatzert and William W. Pharis, Rochester, N.Y., assignors to General Dynamics Corporation, a corporation of Delaware Application July 26, 1955, Serial No. 524,520

10 Claims. (Cl. 179—6.3)

This invention relates to telephone systems and more particularly to coin control systems for use therein.

It is old to provide telephone systems for use in connection with paystations. The operator, in such systems, controls the disposition of coins which may be deposited in the coin box of the telephone to pay the charges required for the completion of a toll call. Sometimes this control feature is arranged so that an operator at a central office may control the disposition of coins at a remote office, such as in a community dial office or the like, for example. In this case, it is necessary to provide means whereby the operator may control office equipment in the community dial office.

A first object of this invention is to provide a new and improved coin control telephone system.

A second object of this invention is to provide a coin control telephone system where an operator at a central office may control the disposition of coins at a remote office.

Another object of this invention is to provide coin control in a four-wire telephone system.

Still another object of this invention is to provide a new and improved coin control trunk circuit.

Yet another object of this invention is to provide a coin control selector and coin control trunk circuit which may be used to control the disposition of coins on either incoming or outgoing calls.

Still another object of this invention is to provided a new and improved toll and local connector for use in a coin control system.

The above described objects are accomplished by means of a telephone system wherein a remote office includes a trunk circuit which may be used on either incoming or outgoing calls. In the case of outgoing calls, a telephone connection may be extended from the remote office through a trunk circuit to an operator at a central or distant office. In the case of incoming calls, the trunk circuit may be used to extend a telephone connection from the operator at the central or distant office to a local switch train in the remote office. A special coin control trunk line has access to this trunk circuit by way of a coin control selector. It may be seized responsive to the operator's control at the office. The coin control selector seizes the trunk circuit over a single point of access. The disposition of coins may be controlled over this point of access without regard to whether the call is incoming or outgoing therefrom. Part of this local switch train includes a local and toll connector in which relays are reused a maximum number of times to reduce the parts necessary to provide a complete unit.

It is thought that these and other objects will be obvious to those skilled in the art and that the invention may be explained best by means of the following description when taken in connection with the attached drawings in which:

Fig. 1*a* shows by block diagram a telephone system using the coin control features. Items 19, 21 and 24 of this block diagram are in heavily inked rectangles, thus indicating that they are the circuits shown in detail in the remainder of the drawings;

Figure 14:
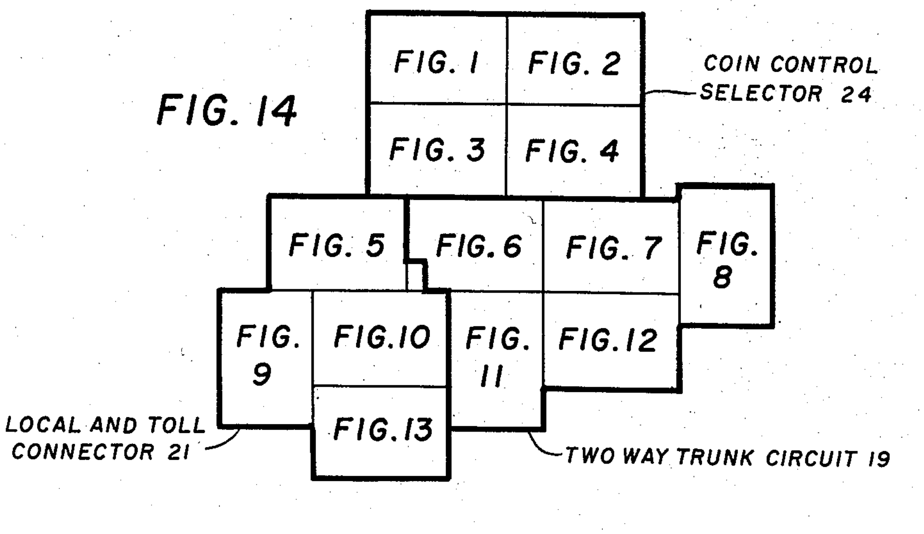
Figure 15:
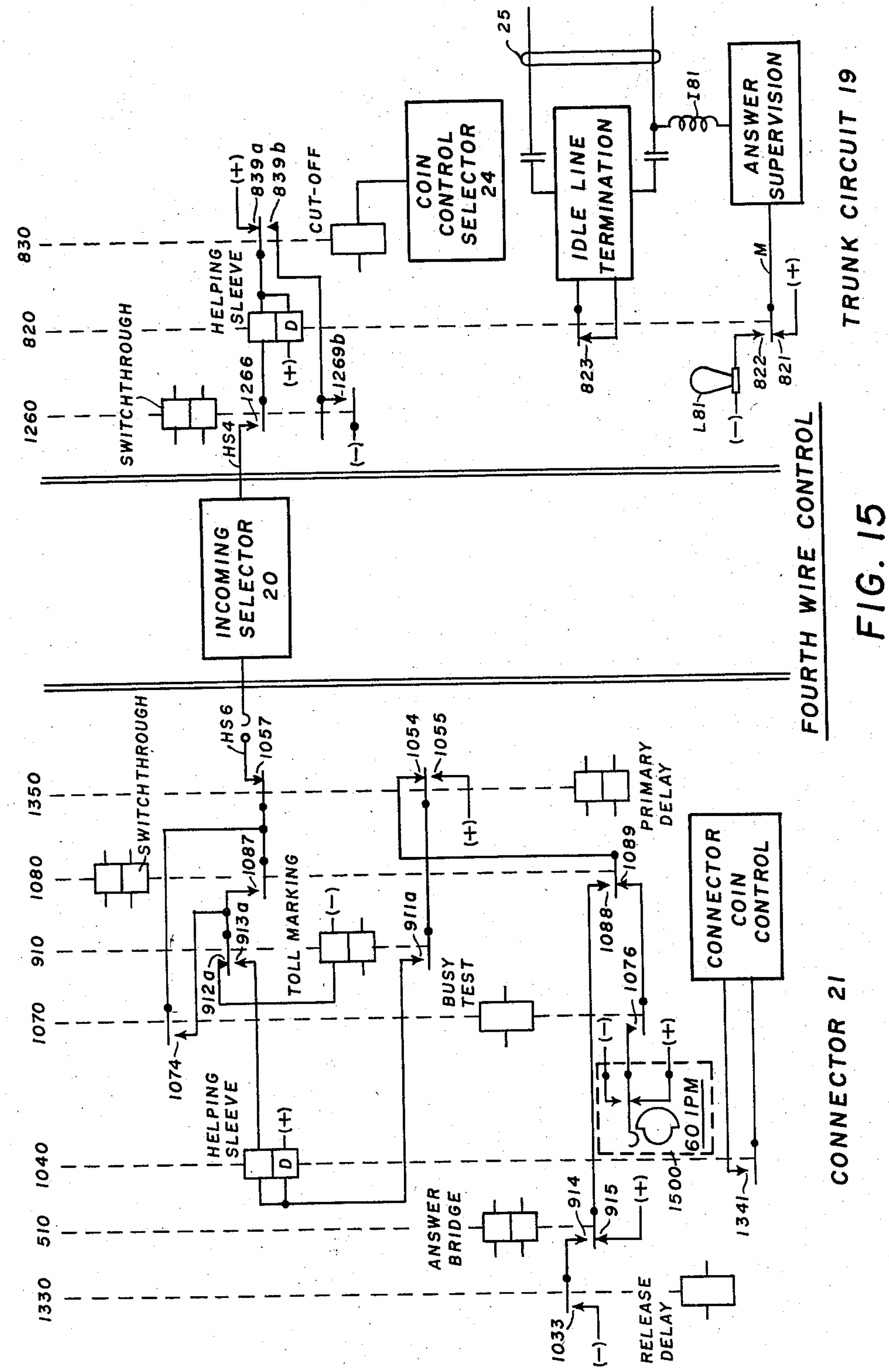

Fig. 14 shows the manner in which the foregoing figures should be arranged to provide a complete and understandable circuit; and Fig. 15 shows a skeletonized circuit based upon the detailed drawings. The parts and components of this drawing have the same reference numerals as the same parts in the detailed drawings. It is though that this figure will explain the fourth wire control with greater efficiency.

The source of potential is shown in the drawings by plus (+) and minus (−) signs. As in the case of most telephone circuits, the plus (+) potential is described as connected with ground and the minus (−) potential is described as battery. It should be understood that this or any other suitable source of power may be used.

BRIEF DESCRIPTION

Figure 1:
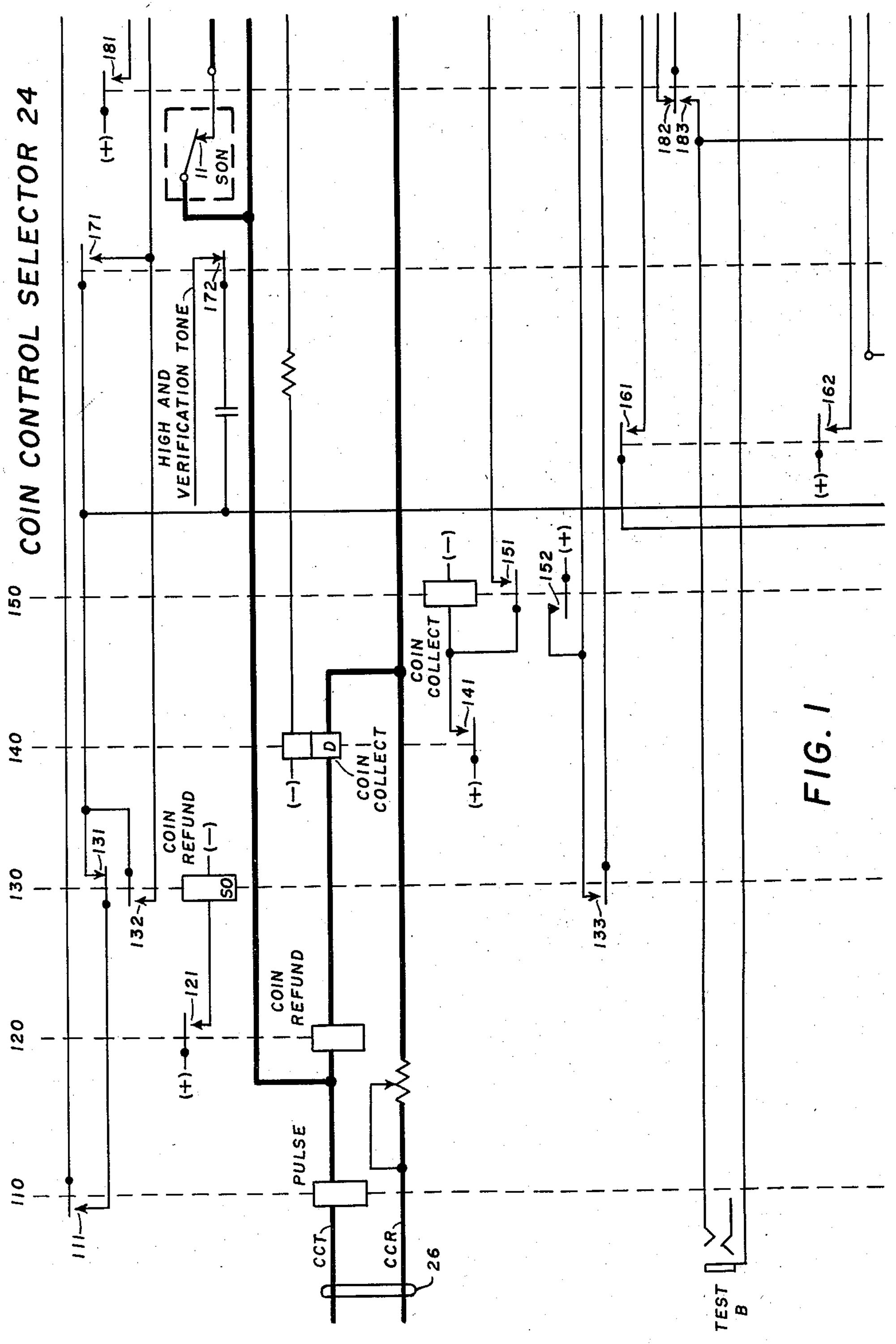
Figs. 1–4 show a coin control selector.
Figure 1A:
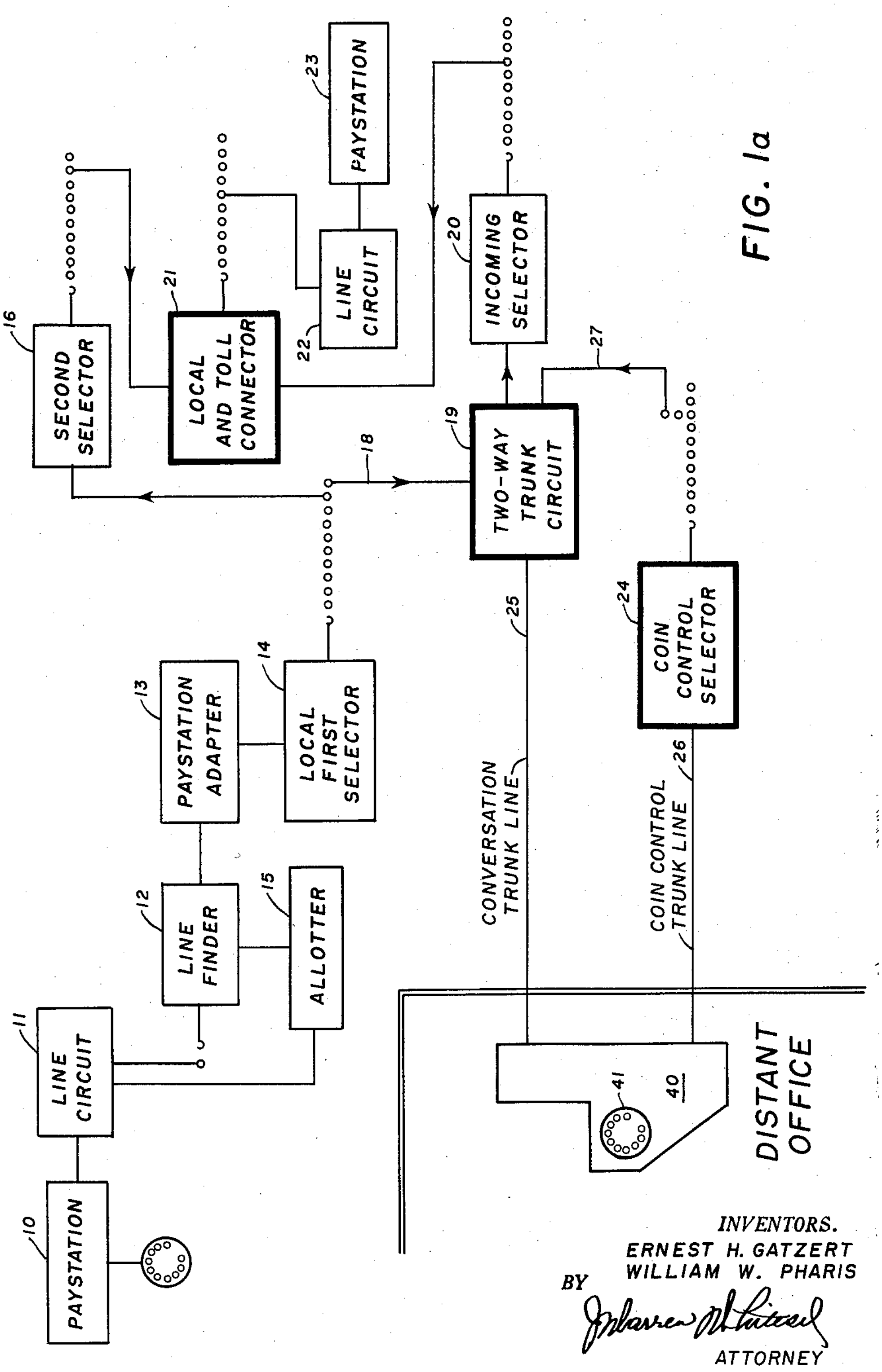
Figure 2:
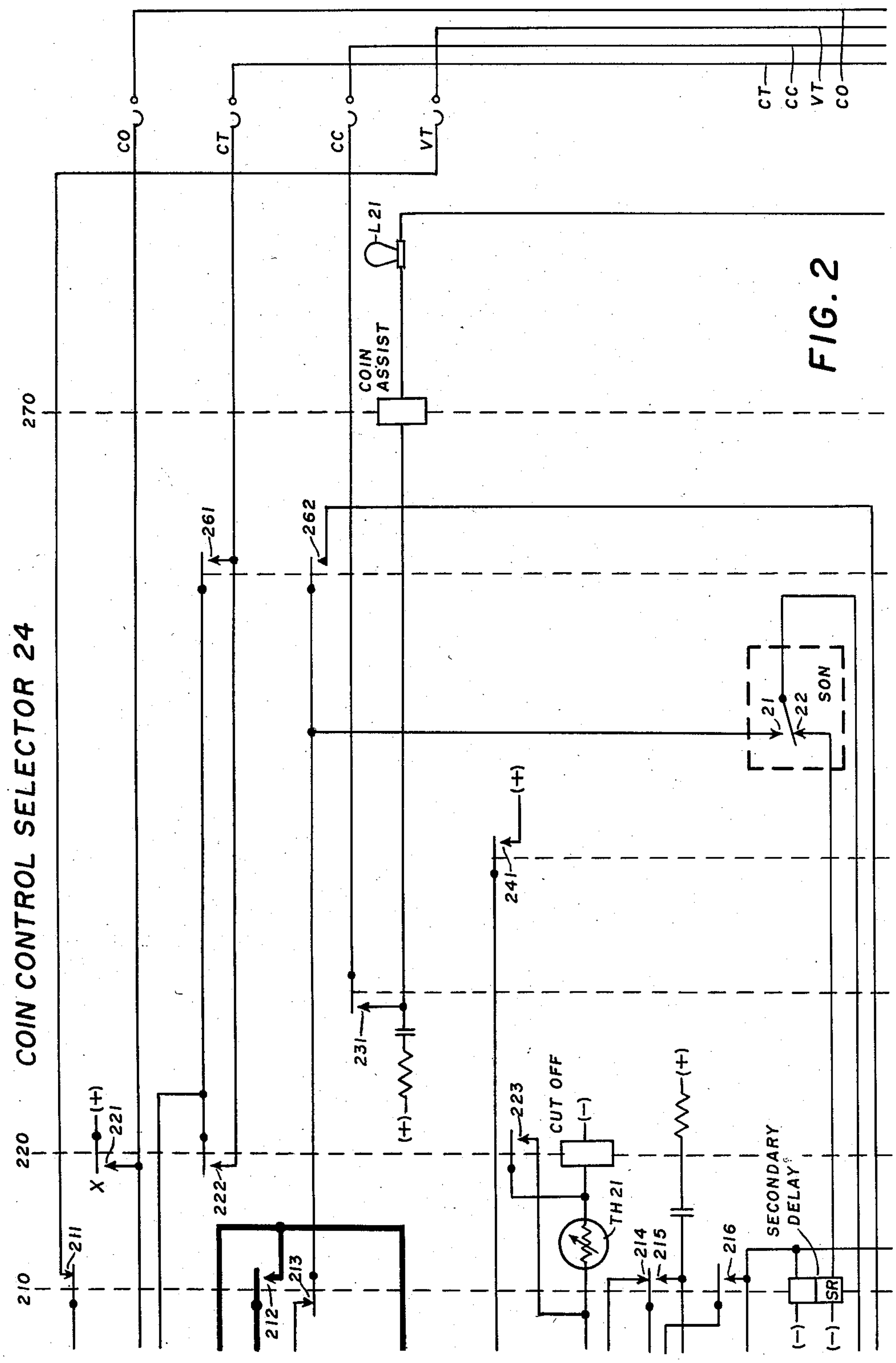

This invention may be explained briefly by making reference to Fig. 1*a*. This figure shows by block diagram a telephone system adapted to use the coin control features of the invention. For example, the subscriber at paystation 10 may initiate a telephone call by removing his receiver or handset and depositing a required coin. Allotter 15 causes line finder 12 and line circuit 11 to cooperate to find the calling line which is extended through selector 14. The next telephone function depends upon the ultimate destination of the call. For example, digit pulses transmitted from paystation 10 may cause local first selector 14, second selector 16 and connector 21 to seize and signal paystation 23. On the other hand, selector 14 may be directed to a particular level from which toll calls may be completed, such as the tenth or zero operator level, for example. In this case, a circuit is completed over conductors 18, two-way trunk circuit 19, and trunk line 25 to a distant office. When the operator answers, the coin which was deposited at paystation 10 to make the call is returned. The operator at position 40 may converse with the calling subscriber at paystation 10. Then she instructs him to deposit in the coin box of telephone 10 a certain amount of money depending upon the charges for completing the call.

Operator 40 may use special coin control trunk line 26 and coin control selector 24 to control the disposition of coins at paystation 10. First she directs a switch associated with selector 24 by means of digit pulses transmitted by any suitable device, such as dial 41, for example, according to the numerical designation of trunk circuit 19 through which the call has been extended. For example, if the number of two-way trunk circuit 19 is "83" the switch is stepped in its primary direction to its eighth level and then in its secondary direction to its third set of terminals to which conductors 27 are attached. Next, the operator at position 40 may proceed to control the disposition of coins deposited at paystation 10.

Incoming calls may be extended from operator position 40 over trunk line 25 to two-way trunk circuit 19. From there the call is completed responsive to digit pulses transmitted by the operator at position 40 over trunk line 25 to trunk circuit 19. These pulses cause incoming selector 20 to seize an idle local connector, such as connector 21, for example. The following digit pulses operate connector 21 to complete the call to paystation 23. If necessary, the operator at position 40 may use coin control selector 24 to control the disposition of coins at paystation 23.

The inventive features of this system reside primarily in the coin control system extending through selector 24, two-way trunk circuit 19, and connector 21.

DETAILED DESCRIPTION

*Call from paystation 10 to operator position 40*

Figure 6:
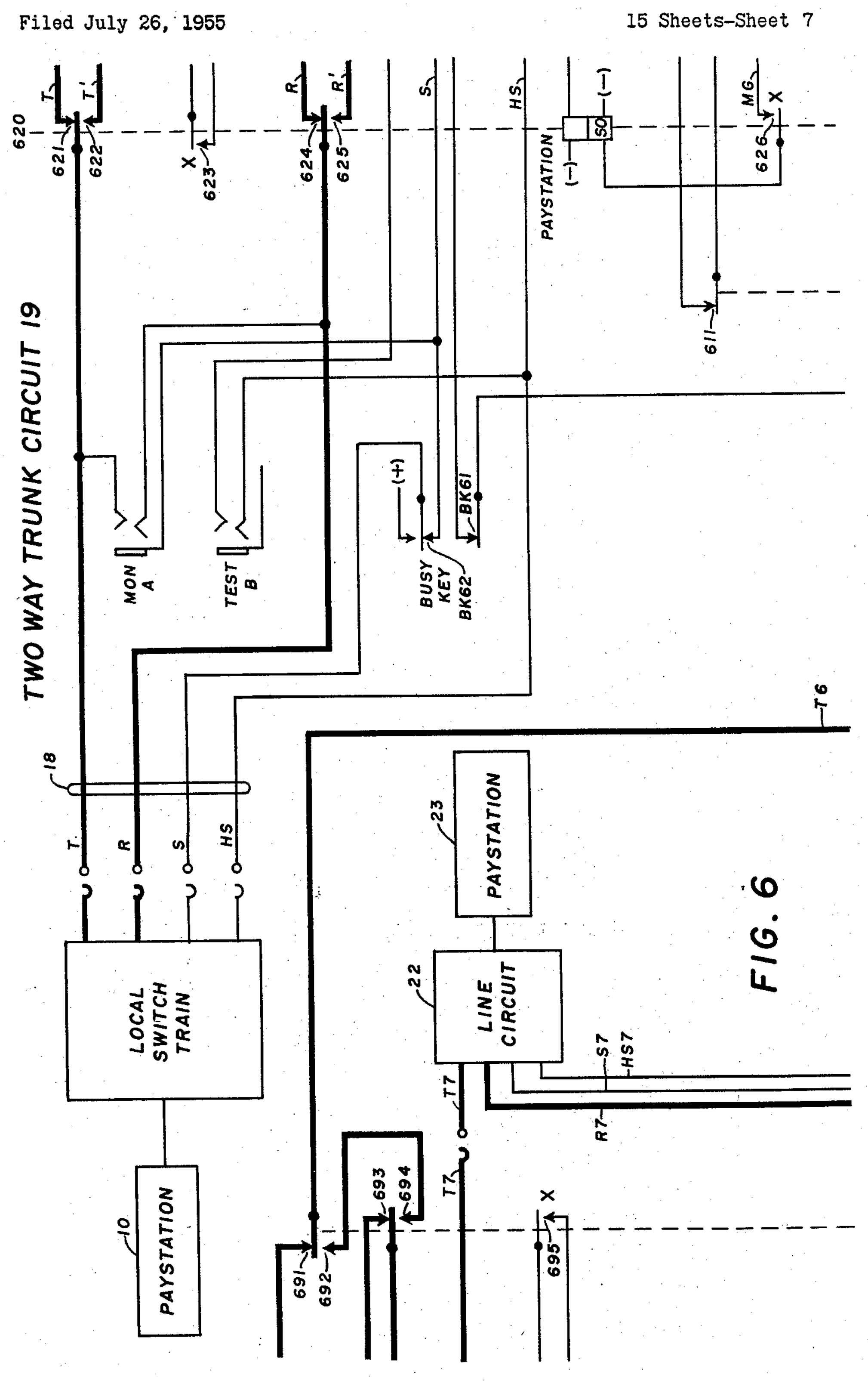
Figs. 6–8, 11 and 12 show a two-way trunk circuit.

The first call to be described is originated at paystation 10 and is completed through two-way trunk circuit 19 to operator position 40. Paystation 10 is shown in the upper lefthand corner of Fig. 6.

*Seizure.*—Any suitable local switch train may be used to seize conductors 18 which lead to two-way trunk circuit 19. Responsive thereto, a circuit is completed for operating calling bridge relay 730. The purpose of this relay is to seize the trunk circuit and to control the transmission of a seizure signal over the trunk line 25 to switchboard 40 at the distant office. The circuit for operating calling bridge relay 730 may be traced from (−) battery through the lower winding of relay 730, rest contacts 762, 834, the lower lefthand winding of repeat coil RC81, rest contacts 838, 724, 624, conductor R, the local switch train, paystation 10 where a loop is completed to the tip conductor, and return over the local switch train conductors T, rest contacts 621, 721, 831, the upper lefthand winding of repeat coil RC81, rest contacts 833 and 761 to ground (+) through the upper winding of calling bridge relay 730. Relay 730 closes its contacts 1231 to operate release delay relay 1240 over an obvious circuit. It also closes its contacts 1232 to operate helping sleeve relay 820 over a circuit which may be traced from (−) battery through operated contacts 1232, rest contacts 1267, the upper winding of helping sleeve relay 820 and rest contacts **839*a* to ground (+). Differential relay 820 operates since its lower winding is shunted by the application of ground (+) to both of its terminals via contacts 839*a***.

Release delay relay 1240 is used to hold trunk circuit equipment operated, to control the release thereof, and to assist in certain supervisory functions. In greater detail, release delay relay 1240 operates over an obvious circuit when contacts 1231 close. Responsive thereto, contacts 741 close for applying a ground (+) busy marking to sleeve conductor S. This ground also serves to hold all preceding equipment in an operated condition until the call is terminated. Contacts 742 open to prevent any operation of pulse relay 810 on this call as it functions on incoming calls only. Contacts 743 close to prepare for control of supervisory relay 720 from the distant office. Contacts 744 close to apply a ground (+) marking to master ground conductor MG. This marking is used to hold certain equipment in an operated condition; therefore, when it is removed that equipment falls. Contacts 1241 close to prepare for the transmission of ring-back and paystation tones. Contacts 1242 close; however, they have no function until the operator prepares for coin control. Contacts 1243 close to operate coin tone relay 1110 over the circuit from (−) battery through the winding of relay 1110, rest contacts 1212, 1224 and operated contacts 1243 to ground (+). Contacts 1244 close for lighting monitor lamp MON (Fig. 12) brightly as an indication that the circuit has been seized but has not switched through as yet. The circuit extends from ground (+), through the filament of lamp MON, contacts 1244, 1269, 1225 and the message supervisory conductor to (−) battery, not shown. This feature relates to local supervision for the benefit of maintenance personnel. Contacts 1246 close to prepare for peg count or stated otherwise for a traffic survey. Contacts 1247 open to remove the ground marking normally applied to the all-trunks-busy conductor. This conductor provides means for indicating when all trunks in the rank including circuit 19 are busy. That is, as each trunk similar to circuit 19 becomes busy, it removes a ground (+) marking normally extended over the all-trunks-busy conductor. When the last trunk circuit has become busy, there is no marking on the all-trunks-busy conductor and responsive thereto a register is operated thus recording an overflow condition. Previously, this marking extended from the all-trunks-busy conductor over rest contacts 1247, 1214, busy key contacts BK61 and rest contacts 766 to ground (+).

Helping sleeve relay 820 operated responsive to the energization of calling bridge relay 730 and the completion of a circuit including ground (+), contacts **839*a*, the upper winding of relay 820, contacts 1267, 1232 and (−) battery. This relay is used to control the application of idle line termination, to extend a seizure signal to the distant office and to give local supervision. More particularly, its contacts 823 open to remove the idle line termintaion normally completed across conductors T and R. This termination may be traced from conductor T over conductor T2, rest contacts 823, capacitor C81, resistor R81, rest contacts 1264, conductor R2 and conductor R. Contacts 821 open and 822 close, thereby switching conductor M from ground (+) to (−) battery. The (−) battery is applied through the filament of lamp L81, operated contacts 822, conductor M, the upper winding of signal relay 840, impedance I81 and conductor R3 of trunk line 25, to the distant office. This marking signals the operator at position 40 thus indicating that a call is awaiting her answer. Signal relay 840** is differentially energized at this time so that it does not operate.

Coin tone relay 1110 operates as explained above. Since it is assumed that call is from a paystation, this relay is used at this time to control the refund of the coin originally deposited at the paystation and to transmit tone indicating that the call originated at a paystation. Contacts 611 open thereby temporarily disabling relay 710 which is not required at this time. This prepares for the control of coin refund. Contacts 1111 close to prepare a circuit for shunt relay 1250. Contacts 1112 close to start common interrupter equipment which may be necessary to provide tones and pulses required during the completion of a call. Contacts 1113 close also to prepare for coin refund. Contacts 1114 close to complete a circuit for transmitting ring-back tone to inform the calling subscriber that his call is being completed. This circuit extends from the ring-back tone conductor over rest contacts 1213, 1227, capacitor C111, operated contacts 1114, 1241, conductor R2, conductor R, rest contacts 724, 624, the local switch train, paystation 10 and return over the local switch train, conductor T, contacts 621, 721, 831, the upper left hand winding of repeat coil RC81, contacts 833, 761 and the upper winding of relay 730 to ground (+).

*Operator answers.*—Nothing further happens until the operator at position 40 responds to the seizure signal and answers the call. Responsive thereto, a signal is transmitted over conductor R3, through impedance I81, the upper winding of signal relay 840, conductor M, operated contacts 822 and the filament of lamp L81 to (−) battery. Now, the direction of current flow is such that relay 840 operates and closes its contacts 841. Ground (+) is extended to operate supervisory relay 720 over the circuit including contacts 841, 743, and the lower winding of supervisory relay 720 to (−) battery.

Relay 720 operates as an indication that the operator has answered. Responsive thereto, contacts 721, 722, 724 and 725 operate to reverse the direction of battery flow over conductors T and R. That is, before the operation of supervisory relay 720, battery flow was from (−) battery through the lower winding of calling bridge relay 730, rest contacts 762, 834, the lower lefthand winding of repeat coil RC81, rest contacts 838, conductor R, rest contacts 724, 624, and the local switch train to paystation 10, with return from paystation 10 over the local switch train, conductor T, rest contacts 621, 721, 831, the upper lefthand winding of repeat coil RC81, rest contacts 833, 761, and the upper winding of calling bridge relay 730 to ground (+). After relay 720 has operated, this direction of current flow is reversed. Contacts 726 close to extend a resistance battery marking to conductor HS for any suitable supervision purposes which may be required in connection with the local switch train. This circuit may be traced from (−) battery through the resistance of the non-inductive (NI) upper winding of relay 720, rest contacts 753, operated contacts 726, conductor HS, cable 18, and the local switch train to ground (+), as required. Contacts 1221 have no effect at this time since contacts 611 are open. Contacts 1222 complete an alternate holding path for release delay relay 1240. Contacts 1223 close to operate shunt relay 1250. The circuit for operating this relay extends from ground (+) through operated contacts 1111, rest contacts 1211, operated contacts 1223 and the winding of shunt relay 1250 to (−) battery. Contacts 1224 open to break the original operating circuit from ground (+) at contacts 1243 to coin tone relay 1110. However, it does not release immediately, due to the charge stored on capacitor C113. This feature will be explained below in the section entitled "Paystation Tone."

Heretofore, monitor lamp MON (Fig. 12) glowed brightly over a circuit which was traced from ground (+) through the filament of lamp MON, operated contacts 1244, rest contacts 1269, 1225 and the message supervisory conductor to a (−) battery, not shown. Now, after relay 720 operates contacts 1225, the lamp glows dimly over a circuit which may be traced from ground (+) through the filament of monitor lamp MON, operated contacts 1244, resistor R121 and the message supervisory conductor to (−) battery, not shown. Contacts 1227 open to terminate ring-back tone and 1226 close to prepare for paystation tone. Contacts 1228 close to extend a marking to the peg count conductor thus giving a traffic survey of the number of times that the trunk is used. This circuit may be traced from the peg count conductor through operated contacts 1115, 1228, 1246, rest contacts 1214, busy key contacts BK61 and rest contacts 766 to ground (+).

*Automatic refund.*—Shunt relay 1250 operates. The reason for operating it at this time is to control coin refund. Since it is assumed that the call originated in a paystation, conductor HS is marked by ground (+). On the other hand, if the call had originated from other than a paystation, there would be no ground marking on conductor HS. This ground marking is extended from conductor HS through contacts 726 and 752 to (−) battery through the upper winding of paystation relay 620.

Relay 620 operates to refund the coin that was deposited to originate the call. Preliminary or "X" contacts 626 close when relay 620 is energized over its upper winding. The circuit for holding operated relay 730 includes contacts 621 and 624 which are about to be opened. Hence, the operator will receive on-hook supervision during automatic refund which makes it appear that the calling subscriber has hung up. As will be pointed out presently, after automatic refund relay 730 will be held in an operated condition once more from the calling subscriber's station. Thus, the on-hook supervision is merely a flash. Sometimes this flash is required and sometimes it is unwanted. Therefore to eliminate flash supervision, relay 620 closes its "X" or preliminary contacts 623 to complete an alternate holding circuit for relay 730 if wiring "C" is provided. This circuit extends from (−) battery, through the lower winding of relay 730, contacts 623, 713, 723, wiring "C," resistor R72, contacts 761 and the upper winding of relay 730 to ground (+). If wiring "C" is omitted, this path is open and flash supervision is given. A circuit is completed from ground (+), through operated contacts 744 and 626 to (−) battery, through the lower winding of relay 620. Relay 620 is locked when energized over this circuit. Paystation relay 620 closes its contacts 622 and 625 thereby extending refund battery to operate the paystation mechanism, thus refunding the coin that was deposited to initiate the call. This refund battery may be traced from conductors T and R, through operated contacts 622 and 625 in parallel, rest contacts 711 and 714 in parallel, operated contacts 1113 and the filament of lamp L111 to (−) 110 volt refund battery. Contacts 1121 close; however, they have no effect at this time since contacts 1224 are open.

*Paystation tone.*—It should be recalled that relay 840 operated responsive to the receipt of answer supervision from the distant office. Contacts 841 closed and since release delay relay 1240 was operated at this time, supervisory relay 720 operated. It opened its contacts 1224, thus breaking the original energizing path to coin tone relay 1110. It should be noted that capacitor C113 was charged prior to the opening of contacts 1224. This charging path extended from (−) battery, through capacitor C113, rest contacts 1212 and 1224 and operated contacts 1243 to ground (+). This circuit is opened at contacts 1224. Capacitor C113 begins to discharge through the winding of coin tone relay 1110. Therefore, relay 1110 remains in an operated condition for a brief interval of time after the operator has answered. During this interval, a circuit is completed from the paystation tone conductor, through operated contacts 1122, 1226, capacitor C111, contacts 1114, 1241, conductor R2, rest contacts 838 and repeat coil RC81 to the distant exchange. This tone informs the operator that the call was originated at a paystation.

If the operator should fail to hear the paystation tone and wish to verify, she will disconnect thereby releasing signal relay 840 which in turn opens its contacts 841 to restore supervisory relay 720. Contacts 1224 close and coin tone relay 1110 reoperates. The charging path is completed for recharging capacitor C113. When the operator reconnects at the distant end, supervisory relay 720 reoperates opening contacts 1224. Responsive thereto, coin tone relay 1110 is held briefly by the discharging current from capacitor C113 in the manner explained before.

When coin tone relay 1110 releases, it opens contacts 1111 thereby restoring shunt relay 1250. Previously, this relay has been operated over the path which includes ground (+), contacts 1111, 1211, 1223, the winding of relay 1250 and (−) battery. Shunt relay 1250 releases. Responsive thereto, a circuit is completed for operating coin refund relay 710 over the circuit which may be traced from (−) battery, through the winding of relay 710, rest contacts 718, 611, 1251, operated contacts 1221 and 744 to ground (+). This removes the coin refund battery formerly extended from (−) 110 volt refund battery through lamp L111, contacts 1113 and in parallel over contacts 711 and 714, contacts 622 and 625, cable 18 and the local switch train to paystation 10. Contacts 712 and 715 also complete the talking circuit from cable 18 over conductors T′ and R′ to repeat coil RC81. Contacts 712 and 715 are "X" contacts which close before contacts 713 open to hold relay 730 positively during transfer time of the contacts. After coin refund relay 710 is operated, it locks at its contacts 717 to master ground conductor MG so that if coin tone relay 1110 is reoperated to reapply coin tone, coin refund relay 710 will not restore. Contacts 1212 open so that coin tone relay 1110 depends for its reoperation upon the continued operation of paystation relay 620. Contacts 1213 open so that ring-back tone will not be returned if the operator verifies the paystation tone by causing supervisory relay 720 to drop and reclose contacts 1227. Contacts 1214 open to prevent a second peg count if the operator verifies paystation tone.

*Coil control.*—The operator converses with the calling subscriber and determines the destination of the call. After this she computes the charges for the completion of such calls and instructs the calling subscriber to deposit the required amount of money. Thereafter, the operator at position 40 seizes a coin control trunk line 26 (Fig. 1) which has access to a coin control selector 24. After the operator has seized coin control trunk line 26 and has completed a circuit through conductors CCT and CCR (the upper lefthand portion of Fig. 1), reverse battery is applied in the distant office to conductors CCT and CCR. This closes a circuit for operating pulse relay 110. This relay controls the mechanical driving of the switch responsive to the receipt of digit pulses. Contacts 311 close thereby operating release delay relay 360 over the path from ground (+) through operated contacts 311, the winding of release delay relay 360 and release magnet interrupter contacts RE41 to (−) battery. A circuit is also completed from ground (+) through operated contacts 311, resting primary off-normal contacts PON33 and the upper winding of primary delay relay 380 to (−) battery. Contacts 111 close to prepare a verification tone circuit so that the operator may know that she has dialed the correct trunk circuit.

Figure 3:
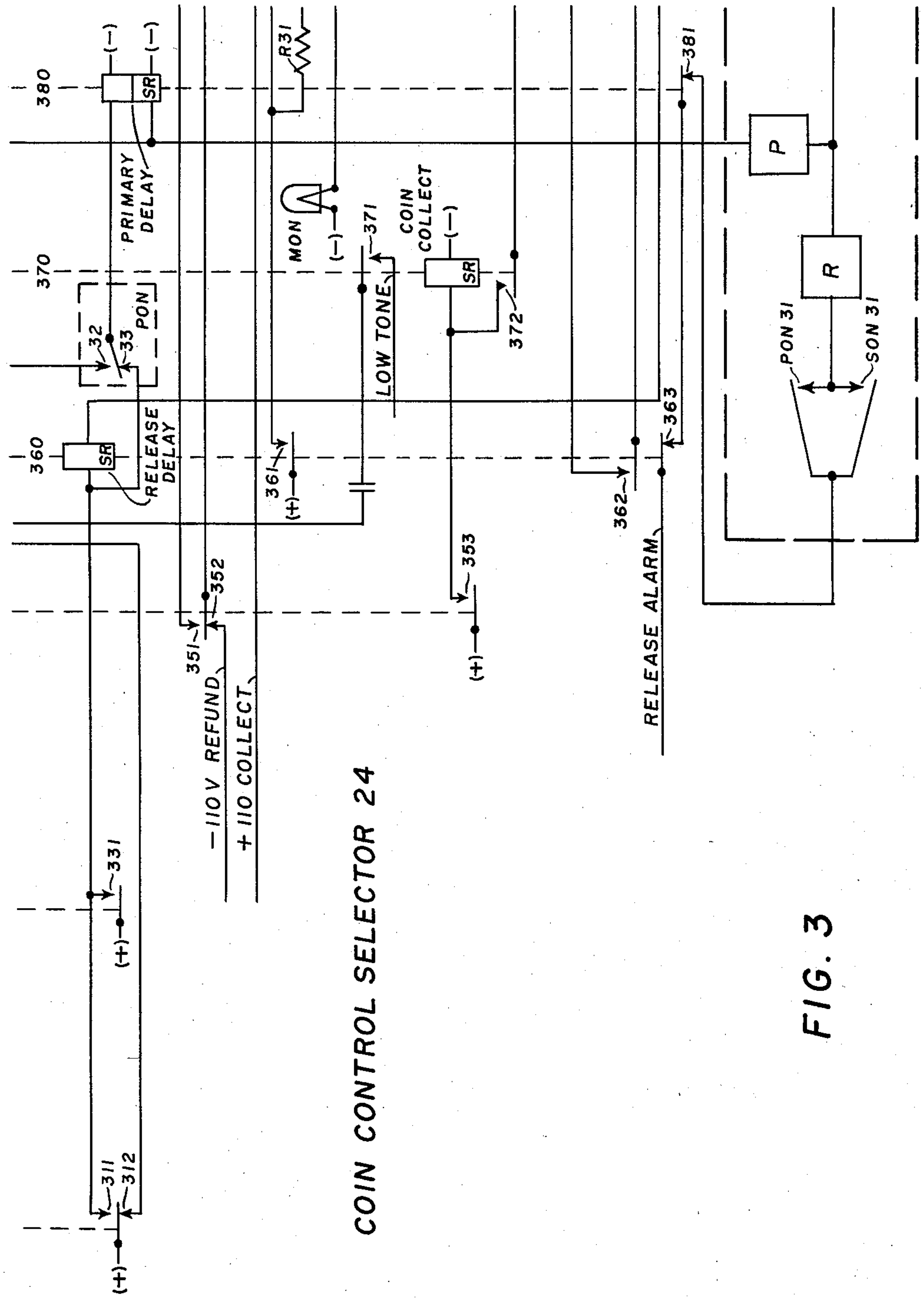

Release delay relay 360 operates. The purpose of this relay is to hold the circuit throughout digit pulsing, to control release and to provide certain local supervisory features. When this relay operates, it closes its contacts 162 to extend a circuit from ground (+) through secondary off-normal contacts SON22, and the lower winding of secondary delay relay 210 to (−) battery. Monitor lamp MON (Fig. 3) is now lit brilliantly as an indication that the coin control selector has been seized but has not switched through as yet. The circuit for lighting this lamp extends from ground (+) through operated contacts 361 and 417 to (−) battery by way of the filament of lamp MON (Fig. 3). The release alarm conductor is opened at contacts 363 to prevent any faulty or premature release. Contacts 362 close to prepare a circuit for coin slave relay 460.

Primary delay relay 380 operates. The reason for operating this relay at this time is to prepare to mark the end of the first train of digit pulses that is to be received. Ground (+) is applied to wiper CO from contacts 181. The pulsing path is prepared at contacts 183.

Secondary delay relay 210 operates. The purpose of this relay is to mark the end of the second digit pulse train. It completes the prepared pulsing path at its contacts 215. Verification tone conductor VT is disconnected at contacts 211. Contacts 212 close to shunt first coin refund relay 120 and the lower winding of coin collect relay 140. This circuit is in parallel with contacts SON11 which have been closed since the switch was seized. Contacts 417 close to complete a circuit for lighting lamp MON (Fig. 3) brightly. The circuit for this function extends from ground (+) through operated contacts 361 and 417 to (−) battery through the filament of lamp MON (Fig. 3). The circuit is now prepared to receive digit pulses which are transmitted from operator position 40 over trunk 26. Nothing further happens until these pulses are received.

*First digit.*—Pulse relay 110 responds to each digit pulse which is a break in the loop circuit including conductors CCT and CCR. Responsive to each digit pulse, relay 110 releases to open contacts 311 and to close contacts 312. This deenergizes release delay relay 360; however, it does not release throughout digit pulsing due to its slow release characteristics. Each time that contacts 312 are closed, a circuit is completed for operating primary stepping magnet P thereby causing the switch to be driven one step in its primary direction for each digit pulse. The circuit for this function extends from ground (+), through rest contacts 312, operated contacts 161, 215, 183, the lower winding of relay 380 and primary magnet P in parallel to (−) battery.

Primary off-normal contacts PON31, PON32 and PON33 are operated responsive to the first step of the switch in the primary direction. When contacts PON33 open, the original energizing circuit for primary delay relay 380 is broken; however, this relay does not release since it is energized over its lower winding each time that a digit pulse is received. Relay 380 is slow-to-release; therefore, it continues to hold throughout digit pulsing and releases only after the last pulse in the digit pulse train has been received.

Pulse relay 110 follows the remaining digit pulses. It opens and closes the circuit to primary delay relay 380 and primary stepping magnet P responsive to each digit pulse. The switch is driven one step on each pulse. On completion of the digit pulse train, a loop across conductors CCT and CCR remains closed long enough for primary delay relay 380 to restore. It opens contacts 183 and closes contacts 182 thereby transferring the pulsing path from the primary to the secondary magnet. The switch is now ready to receive the second digit pulse train.

*Second digit.*—Again, each digit pulse is in the form of a break in the loop extending across conductors CCT and CCR. Responsive to each break in this loop, pulse relay 110 restores to close contacts 312. This, in turn, causes the switch to step in its secondary direction at the rate of one step per pulse. The circuit for this function may be traced from ground (+), through rest contacts 312, operated contacts 161, 215, rest contacts 182, operated contacts 216, the upper winding of secondary delay relay 210 and the winding of secondary magnet S in parallel to (−) battery. Responsive to the first switch step in the secondary direction, secondary off-normal contacts SON11, SON21, SON22 and SON31 are operated. The original energizing path for secondary delay relay 210 is broken when contacts SON22 open; however, this relay does not release until the end of digit pulsing due to the fact that it is a slow release relay and due to the fact that it receives an energizing pulse over its upper winding each time that a digit pulse is received. When relay 210 releases, contacts 212 open to remove the shunt from around relays 120 and 140.

Figure 4:
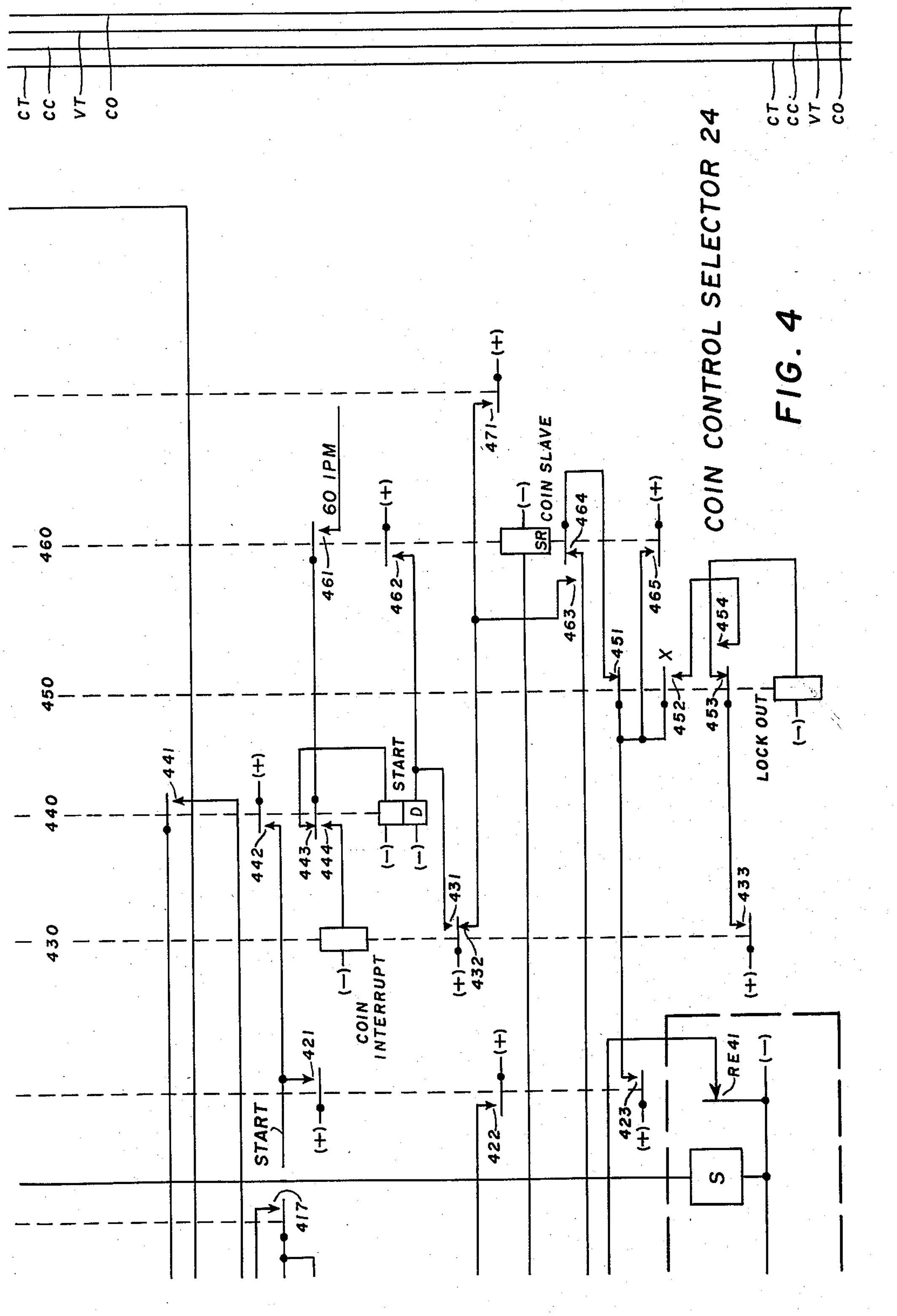
Figure 5:
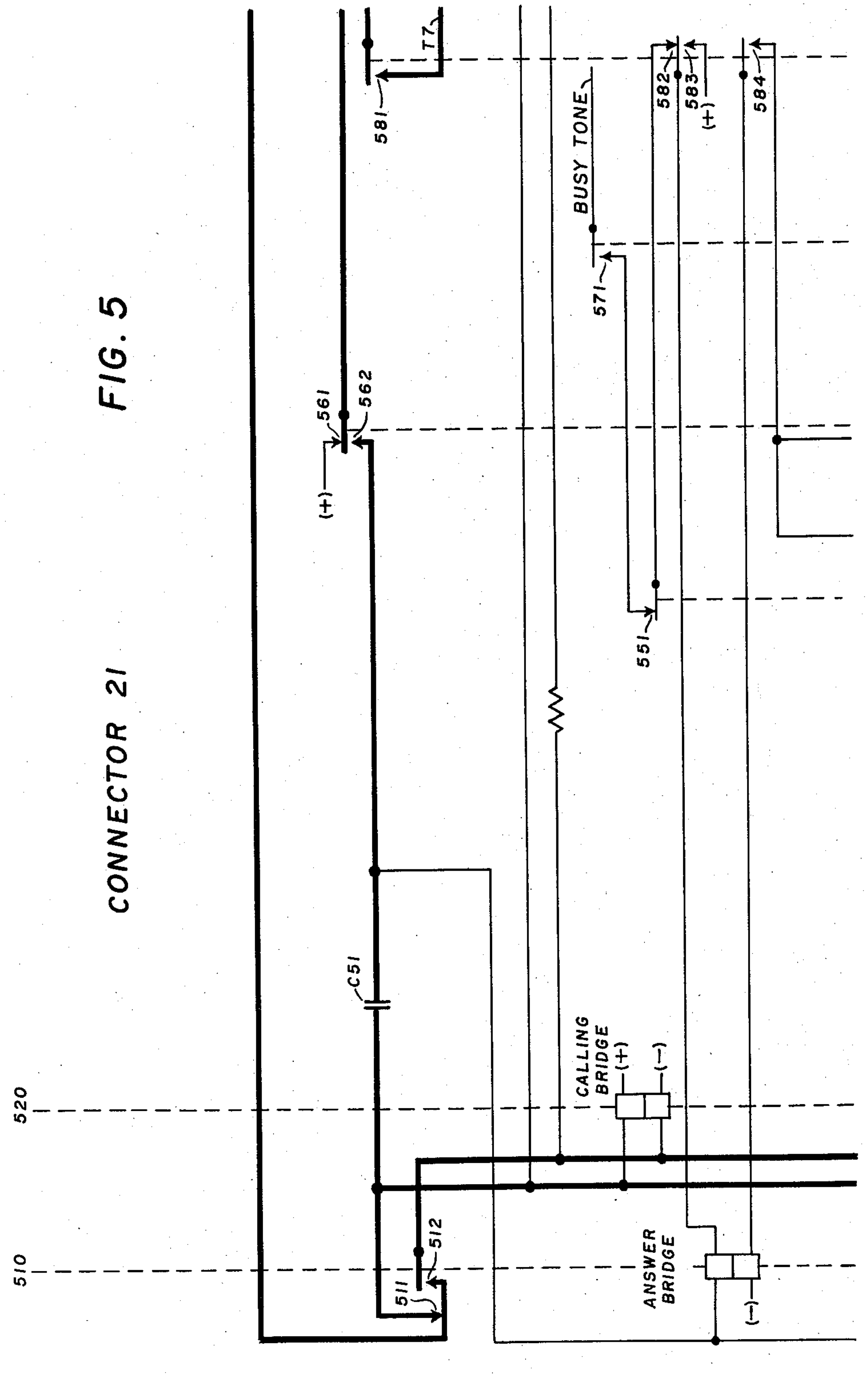
Figs. 5, 9, 10 and 13 show details of a local and toll connector.
Figure 7:
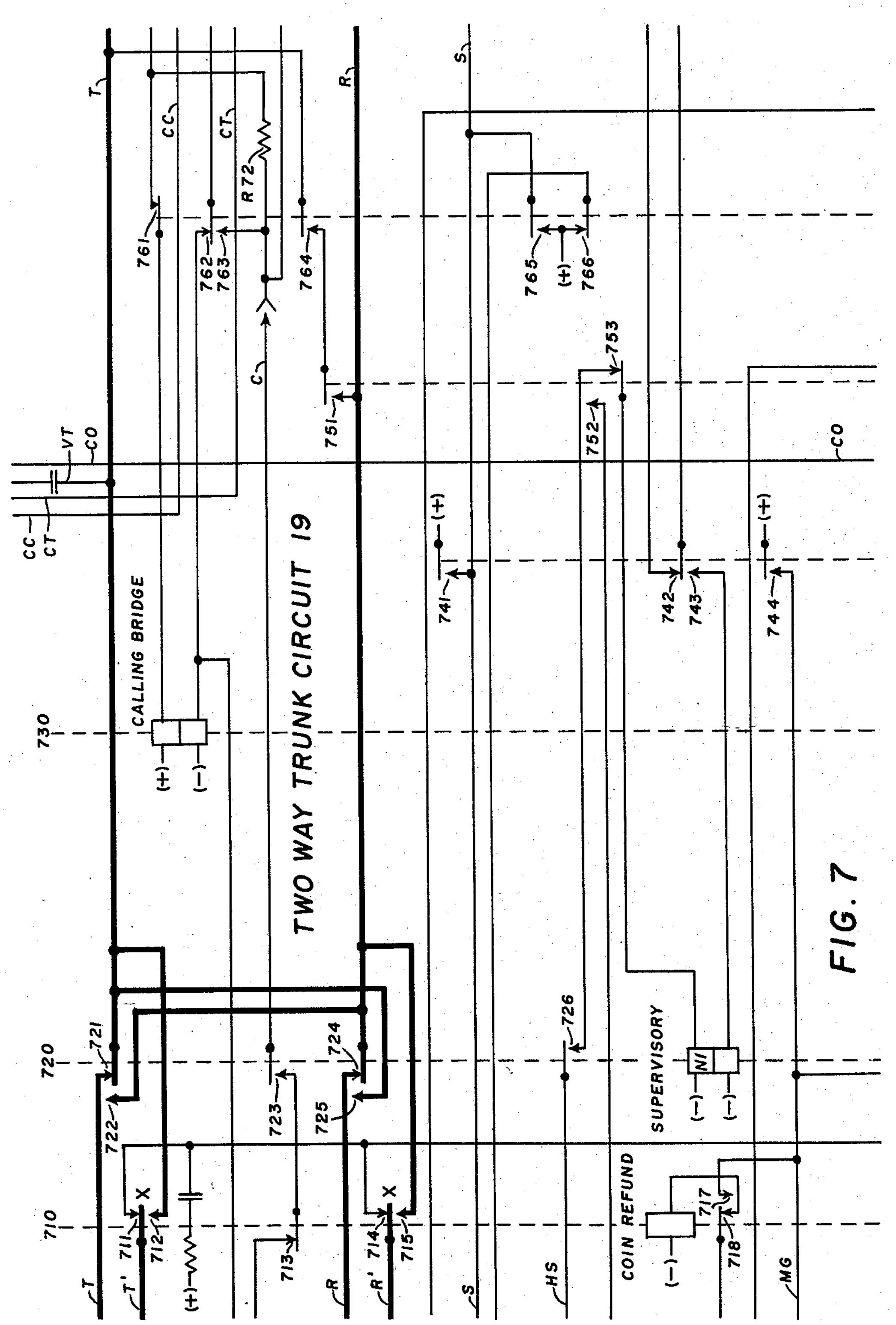
Figure 8:
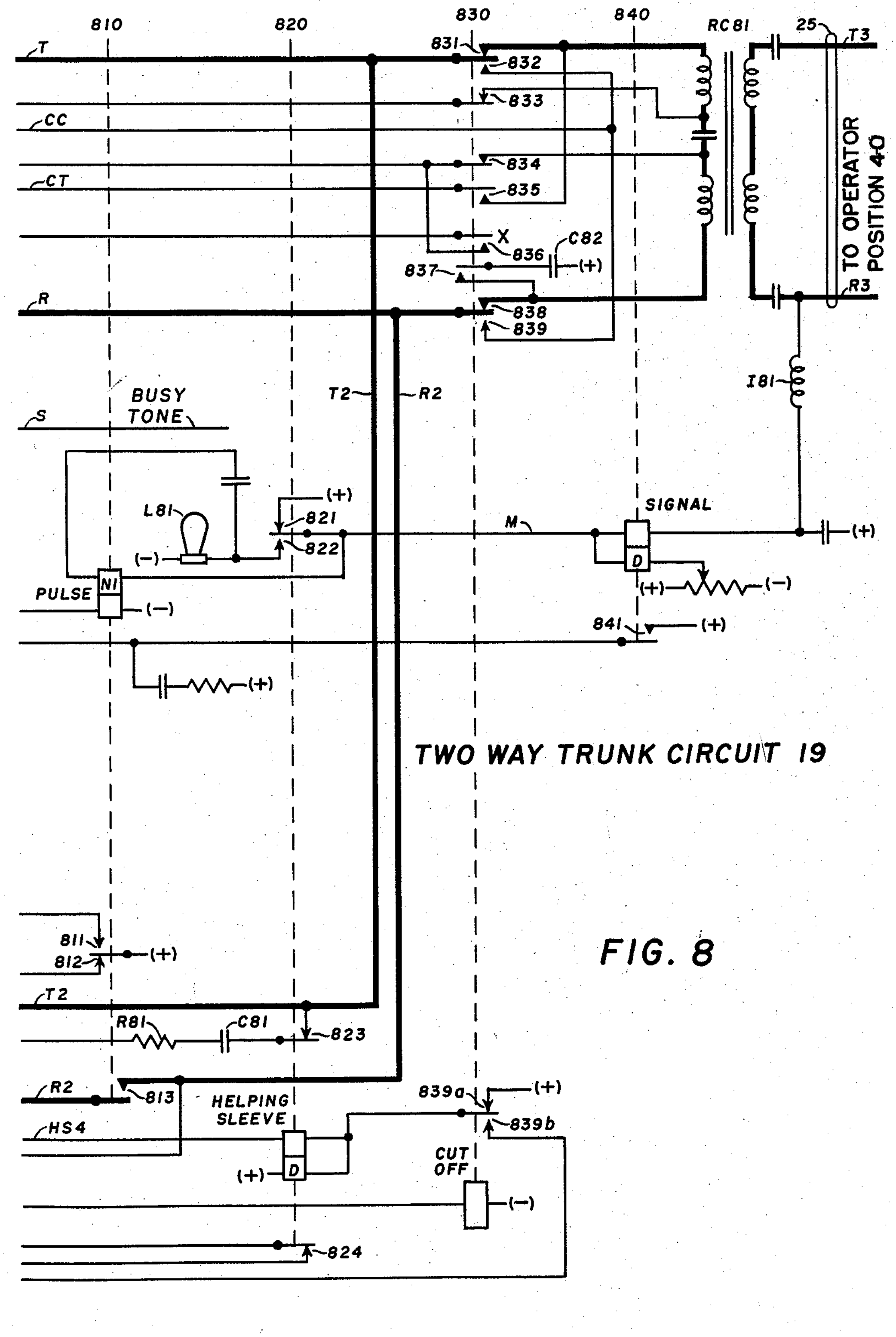
Figure 9:
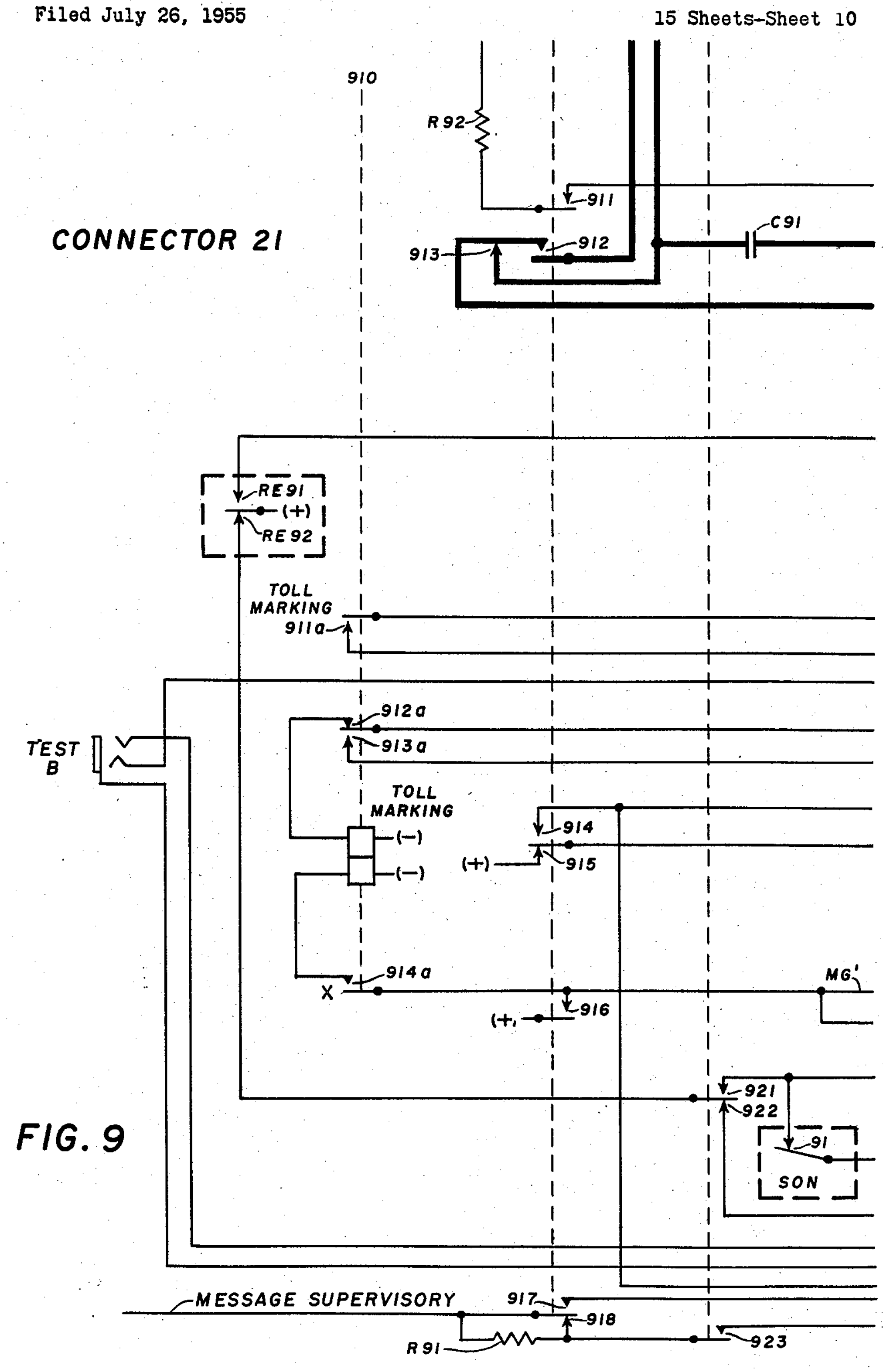
Figure 10:
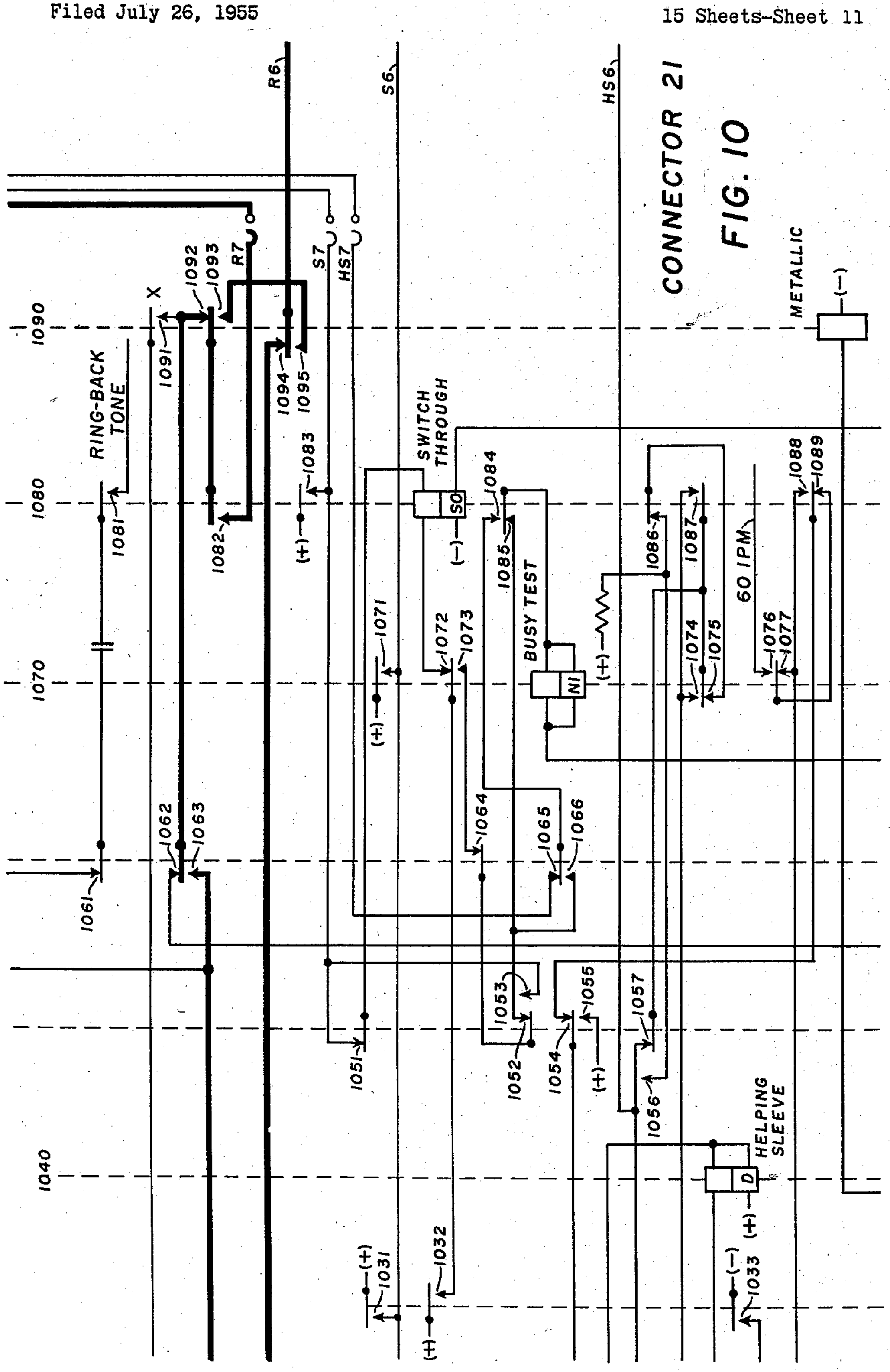

*Verification tone.*—The switch is driven to the particular set of terminals which are desired. These are the terminals which are individual to two-way trunk circuit 19. After the last digit pulse has been received, secondary delay relay 210 restores. This connects verification tone to the talking conductors in trunk circuit 19 thereby informing the operator that she has dialed the correct digit since she is listening over the original connection for the tone. The circuit for this verification tone may be traced from the high and verification tone conductor at contact 172 over rest contacts 131, operated contacts 111, rest contacts 211, conductor VT to Figs. 4 and 7, conductor T, rest contacts 831, the upper lefthand winding of repeat coil RC81, rest contacts 833, 761 and the upper winding of calling bridge relay 730 to ground (+). This tone is induced in the righthand windings of repeat coil RC81 and transmitted over cable 25 to operator position 40.

Monitor lamp MON (Fig. 3) is caused to burn at a reduced level of illumination due to the fact that contacts 417 are open and the energization circuit for lamp MON now extends through resistor R31. This is an indication that the coin control selector has switched through. A circuit is prepared for cutoff relay 220 when contacts 214 close. Contacts 213 close to energize coin collect relay 140. The circuit for this function extends from (−) battery through the upper winding of coin collect relay 140, rest contacts 213, operated secondary off-normal contacts SON21 and operated rest contacts 162 to ground (+). Coin collect relay 140 does not operate because it is differentially energized, the upper winding being energized over the previously traced circuit from ground on contacts 162 and the lower winding being energized in series with conductors CCT and CCR. However, coin refund relay 120 does operate in the loop including conductors CCT and CCR extending to the distant office. It closes its contacts 121 thereby operating a second coin refund relay 130. Coin refund relay 130 is slow to operate so that a brief interval transpires during which the verification tone is transmitted in the manner explained above to the operator at position 40. After this brief interval, the tone circuit is broken at contacts 131. Contacts 133 close to prepare a circuit for cutoff relay 220. This circuit is not effective at this time since contacts 312 are now open.

The circuit is now prepared for coin control; therefore, the next circuit functions depend upon the sequence of events which may have transpired heretofore. For example, if the calling subscriber deposited a proper amount, the operator may proceed to collect the coins at this time. On the other hand, there may be occasions when she would proceed to refund the coins.

*Coin collect.*—The operator at the distant office depresses a proper key for controlling coin collection. The direction of battery flow over conductors CCT and CCR is reversed. This reverses the direction of battery flow through the lower winding of differential coin collect relay 140. The flux in the lower winding of relay 140 now aids the flux in the upper winding thus causing the relay to operate. Contacts 141 close thereby operating a second coin collect relay 150.

Relay 150 operates and closes its contacts 152 thus causing thermistor TH21 to heat. This device is arranged so that its resistance goes down as a function of the time over which it is heated. Hence, over the brief interval of time when thermistor TH21 is heating, cutoff relay 220 does not receive enough current to operate. However, after the expiration of this brief interval of time, relay 220 will receive enough current and will operate. Contacts 351 close to prepare the path for applying coin collect battery while contacts 352 open to break the path for applying coin refund battery. Contacts 353 close to operate coin collect relay 370.

When relay 370 operates, it prepares a path for extending a special tone to conductor CT. This tone path may be traced from a low tone conductor through contacts 371, 171, 222 and 261 (both of which are now open) to conductor CT. The lower tone provides a distinctive coin collect signal.

By this time, thermistor TH21 will have heated sufficiently to cause cutoff relay 220 to operate. It closes its contacts 223 thereby by-passing and protecting thermistor TH21. A ground (+) marking is applied through "X" or preliminary contacts 221 to cutoff conductor CO. This ground marking is extended to trunk circuit 19 and over operated contacts 1242 to energize cutoff relay 830.

Relay 830 opens contacts 839*a* and closes contacts 839*b*, thereby switching the marking extended to conductor HS4 through the upper winding of helping sleeve relay 820 from ground (+) on contacts 839*a* to (−) battery on contacts 1245. This has no effect in this particular call. Contacts 832 and 839 close thereby placing a short circuit across conductors T and R. Contacts 831 and 838 open thereby breaking the talking connection to repeat coil RC81. This is in preparation for the application of collect or refund potential to the talking conductors. Contacts 833 and 834 open to break the connection to calling bridge relay 730; however, it does not release at this time because a holding path is completed over the following circuit: from (−) battery, through the lower winding of calling bridge relay 730, rest contacts 762, operated contacts 836, resistor R72, rest contacts 761 and the upper winding of calling bridge relay 730 to ground (+). It should be noted that contacts 836 are preliminary or "X" contacts which are adapted to make before contacts 833 and 834 break thus furnishing a positive holding circuit for calling bridge relay 730.

A distinctive tone is now transmitted to the operator, informing her of the fact that a coin control potential is applied to conductors T and R. This distinctive tone may be traced from the low tone source through contacts 371, 171, operated contacts 222, control tip conductor CT, operated contacts 835, the lefthand windings of repeat coil RC81 and operated contacts 837 to ground (+) through capacitors C82. This tone is repeated through repeat coil RC81 to the operator at position 40 in the distant exchange.

Returning to the operation of the cutoff relay 220, it also closes its contacts 421 thereby applying a ground (+) potential to the start conductor. This initiates the operation of suitable common equipment which furnishes various tones, pulses and currents that are necessary to complete the call. A circuit is completed at contacts 422 for holding coin collect relay 370 in an operated condition. This holding circuit includes contacts 372 and 422. Contacts 423 close to prepare part of a holding circuit for various relays in the coin control selector. Responsive thereto, coin slave relay 460 operates, its energizing circuit being traced from (−) battery, through the winding of relay 460, operated contacts 362, rest contacts 464, 451, and operated contacts 423 to ground (+).

Relay 460 operates to control the disposition of the coin. An alternate path is closed at contacts 261 for applying the low tone indicating collection over the talking trunk to the operator. A circuit is also completed for operating primary delay relay 380. This circuit may be traced from (−) battery, through the upper winding of primary delay relay 380, operated primary off-normal contacts PON32, operated contacts 262, operated secondary off-normal contacts SON21, and operated contacts 162 to ground (+). The upper winding of start relay 440 is connected at contacts 461 to a 60 i.p.m. conductor. The lower winding of start relay 440 is energized through an obvious circuit including contacts 462. A holding circuit for lockout relay 450 is prepared at contacts 465.

Start relay 440 is used to start the period during which the coin control potential is applied to the line. If a ground pulse is present on the 60 i.p.m. conductor when start relay 440 is connected thereto, it will not operate because it is then differentially energized due to the current flowing in the upper and lower winding with the magnetic flux in the two windings opposing each other. This prevents the sending of an initial pulse of coin control voltage which is too short to operate the coin collecting mechanism at the paystation. When ground is removed from the 60 i.p.m. conductor, start relay 440 operates over its lower winding, the upper winding being then deenergized. A locking circuit for coin collect relay 150 is completed at contacts 241 and contacts 151. An alternate ground marking is applied to the start conductor at contacts 442. A path is prepared at contacts 441 for extending coin collect battery. Contacts 444 close to place coin interrupt relay 430 under the control of the 60 i.p.m. ground pulses extended from a common interrupter through contacts 461.

When primary delay relay 380 reoperates, it opens a further point in the release alarm conductor at contacts 381 and applies an alternate ground to conductor CO at contacts 181.

When the next ground pulse appears on the 60 i.p.m. conductor, coin interrupt relay 430 is operated. It is used to apply collect battery pulse fashion thereby shaking the coin control mechanism at the rate of 60 i.p.m. Its energizing circuit extending from the 60 i.p.m. conductor through operated contacts 461 and 444 to (−)

battery through the winding of coin interrupt relay 430. When coin interrupt relay 430 operates, it closes its contacts 433 thereby operating lockout relay 450 to keep the coin control operating until the coin has been disposed of without regard as to whether the operator has restored her coin control key prematurely. Contacts 431 close to complete an alternate holding circuit for start relay 440.

Coin collect potential is applied to control the disposition of coins at paystation 10. The circuit for applying this coin collect potential extends from the (+) 110 v. collect conductor through operated contacts 441, 351, the filament of lamp L21, the winding of coin assist relay 270, operated contacts 231, conductors CC, contacts 832 and 839 (in parallel), conductors T and R (in parallel), contacts 712 and 715 (in parallel), contacts 622 and 625 (in parallel), conductors T and R (in parallel) and through the local switch train to paystation 10. Coin slave relay 460 originally operated over contacts 423, 451, 464, 362, and the winding of relay 460 to (−) battery; then, it locked in its operated condition over the following circuit: from (−) battery, through the winding of relay 460, operated contacts 362, 463 and rest contacts 432 to ground (+). When coin interrupt relay 430 operates, it opens contacts 432; however, coin slave relay 460 is slow-to-release and does not restore immediately. Coin assist relay 270 is operated by the collect potential in series with the coin collecting mechanism at paystation 10. Relay 270 closes its contacts 471 thereby completing an alternate locking path for coin slave relay 460 before it has time to release. This path includes ground (+), contacts 471, 463, 362 and the winding of relay 460 to (−) battery.

When lockout relay 450 operates, it closes contacts 452 which are preliminary or "X" contacts adapted to operate before any other of the contacts of lockout relay 450. Contacts 454 make before contacts 453 break; therefore, a positive holding circuit is completed from (−) battery, through the winding of relay 450, operated contacts 454, preliminary contacts 452 and operated contacts 465 and 423 in parallel for holding the lockout relay in an energized position. It opens contacts 451 to prevent a faulty reoperation of relay 460 after the coin has been disposed of.

When the ground pulse is removed from the 60 i.p.m. conductor, the circuit to coin interrupt relay 430 is opened so that it restores. This opens at contacts 431 the alternate holding circuit for start relay 440. Coin slave relay 460 is now held from ground (+), through contacts 432, 463 and 362 to (−) battery through relay 460. The coin collect potential is no longer applied to the calling line when contacts 231 open. Coin assist relay 270 restores to open its contacts 471.

If the coin was disposed of in this one operation, nothing further happens. However, if the coin was not disposed of, the cycle of operations is repeated each time that the 60 i.p.m. ground pulse is reapplied to operate coin interrupt relay 430. This repeated operation of the coin control mechanism tends to shake the coin hopper door at paystation 10.

When the coin is collected or refunded, as the case may be, the circuit through coin assist relay 270 is not completed the next time that a coin control potential is applied. This is due to the fact that the coin ground is no longer applied at paystation 10. Hence, relay 270 does not reoperate when the next 60 i.p.m. pulse appears. Contacts 471 do not close. Coin slave relay 460 releases after the expiration of its slow release time period since its first holding circuit is now opened at contacts 432 and its second holding circuit is not reclosed at contacts 471. When coin slave relay 460 restores, it opens contacts 461 thereby removing the ground which was supplied from the 60 i.p.m. conductor to coin interrupt relay 430. Contacts 262 open to restore primary delay relay 380. It might be recalled that formerly this relay had been holding over a circuit from (−) battery, through its upper windings, operated primary off-normal contacts PON32, contacts 262, operated secondary off-normal contacts SON21 and operated release relay contacts 162 to ground (+). Contacts 261 open to break the tone circuit which informed the operator that the coin collection was in process. Contacts 462 open to break the holding circuit through the lower winding of start relay 440. An alternate holding circuit for lockout relay 450 is opened at contacts 465.

Coin interrupt relay 430 restores when contacts 461 and 443 open. Responsive thereto, contacts 431 open to restore start relay 440. Contacts 231 open to remove the coin collect voltage from conductors CC. Contacts 262 open to denergize primary delay relay 380; however, it does not release immediately due to its slow release characteristics.

When start relay 440 releases, it opens an alternate holding circuit for coin collect relay 150 at contacts 241. The circuit for extending the coin control voltage is opened a second time at contacts 441.

After the brief interval marked by its slow release characteristics, primary delay relay 380 restores. At contacts 381, it prepares a circuit including the release alarm conductor. Contacts 181 open to remove one of the ground (+) markings applied to cutoff conductor CO. At this time the cutoff conductor is controlled over the "X" or preliminary contacts 221 of cutoff relay 220. It might be well to note at this time that cutoff relay 220 is now under the control of relay 150, which in turn is under the control of the operator's coin collect key.

*Restoration of coin control circuit.*—When the operator releases the coin collect key at the distant office, the direction of battery flow over conductors CCT and CCR is reversed. The current which flows through the lower winding of coin collect relay 140 creates a magnetic flux which opposes the flux in the upper winding. This differentially energizes the relay causing it to release—assuming that start relay 440 is released to indicate the proper collection of the coin. Contacts 141 open thereby releasing second coin collect relay 150. Contacts 152 open to release cutoff relay 220. Contacts 353 open one of the alternate holding paths for coin collect relay 370. Contacts 351 and 352 operate to transfer the coin control circuit back to its normal (−) 110 volt refund position.

Cutoff relay 220 restores. Preliminary or "X" contacts 221 are the last to break. Contacts 422 open, thus restoring coin collect relay 370 which is slow to release. Contacts 423 open to break the last holding path for lockout relay 450. Formerly, this holding path included ground (+), contacts 423, 452, 454 and (−) battery. Contacts 222 open to remove the tone connected with tone conductor CT.

Relay 830 releases when cutoff relay 220 finally opens its preliminary contacts 221. This, in turn, opens contacts 832 and 839 while closing contacts 831 and 838 thus returning the trunk circuit to a normal talking condition.

*Coin refund.*—The operator will depress her coin refund key if she wishes to return the coins to the calling subscriber, for example, where he incorrectly deposited too much money. In this case, the loop including conductors CCT and CCR are opened at the distant exchange. Coin collect relay 140 is arranged so that it will not operate when only its upper winding is energized. To operate, it requires the assistance of both windings energized in the proper directions. Therefore, coin collect relay 140 does not operate but remains in a released condition.

Pulse relay 110 restores responsive to the open loop. This closes a circuit to cutoff relay 220 through thermistor TH21. This circuit may be traced from (−) battery, through the winding of cutoff relay 220, thermistor TH21, operated contacts 133 (it might be recalled that relay 130 was operated when the coin control selector was originally seized and that relay 130 has slow release characteristics so that it has not yet released), contacts 214, 161 and 312 to ground (+). After a brief interval, the distant office recloses the loop across conductors CCT and CCR via a high resistance. This high resistance loop holds coin refund relay 120 operated while preventing pulse relay 110 from reoperating. Relay 120 holds its contacts 121 thereby maintaining coin refund relay 130 in an operated condition. Thermistor TH21 continues to heat until it has reached a temperature which is sufficient to operate cutoff relay 220.

Cutoff relay 220 operates its "X" or preliminary contacts 221 thereby applying ground to cutoff conductor CO. This closes a circuit to cutoff relay 830 in the trunk circuit. These contacts are preliminary to allow time for certain functions during incoming calls and need not necessarily be preliminary at this time. Relay 830 operates over a circuit which may be traced from (−) battery through its winding, operated contacts 1242, conductors CO and brush CO, to ground (+) applied through "X" or preliminary contacts 221 of cutoff relay 220. Cutoff relay 830 splits the trunk at its contacts 831 and 838 thereby completing a coin control path at its contacts 832 and 839. A high tone is applied to trunk 25—this time to inform the operator that a coin refund is taking place. That is to say, relay 370 does not operate. Contacts 371 do not close. The special low tone is not applied to conductor VT; rather, a circuit is completed from the high and verification tone source through contacts 172, 132, 222, coin tone conductor CT, operated contacts 835, the lefthand windings of repeat coil RC81, operated contacts 837 and capacitor C82 to ground (+). Cutoff relay 220 also closes its contacts 223 thereby shunting thermistor TH21 to protect it from excessive wear. Contacts 421 close to apply a ground (+) marking to the start conductor for initiating the operation of common equipment such as interrupters or the like. Contacts 423 close to operate coin slave relay 460 over the circuit from (−) battery, through the winding of coin slave relay 460, operated contacts 362, rest contacts 464, 451 and operated contacts 423 to ground (+). This circuit is also used to prepare for holding lockout relay 450.

Coin slave relay 460 operates and completes an alternate path for the tone at its contacts 261. A circuit is also completed for operating primary delay relay 380, this circuit being traced from (−) battery, through the upper winding of relay 380, operated primary off-normal contacts PON32, operated contacts 262, operated secondary off-normal contacts SON21, and operated contacts 162 to ground (+). Contacts 461 close to connect the upper winding of start relay 440 to a 60 i.p.m. conductor. Contacts 462 close a circuit through the lower winding of start relay 440.

If ground is present on the 60 i.p.m. conductor when start relay 440 is connected thereto at contacts 461, start relay 440 will not operate as it is differentially energized by the current flowing through the upper and lower windings which create opposing fluxes. This prevents the sending of a pulse of coin control voltage which is too short to control the mechanism at paystation 10.

When primary delay relay 380 operates, it applies an alternate ground to cutoff conductor CO at its contacts 181. It also opens an alternate circuit to the release alarm conductor at contacts 381.

When ground first appears on the 60 i.p.m. conductor a circuit is closed to operate coin interrupt relay 430. This circuit may be traced from (−) battery, through the winding of relay 430, operated contacts 444, 461 and the 60 i.p.m. conductor to a ground (not shown). When coin interrupt relay 430 operates, it closes a circuit to operate lockout relay 450. This circuit may be traced from ground (+), through operated contacts 433, rest contacts 453 and the winding of relay 450 to (−) battery. An alternate holding circuit is completed at contacts 431 through the lower winding of start relay 440. The original holding circuit for coin slave relay 460 is broken at contacts 432. Formerly, this circuit extended from (−) battery, through the winding of relay 460, operated contacts 362, 463 and rest contacts 432 to ground (+).

A circuit is now completed for transmitting a (−) 110 volt refund current. This circuit may be traced from the (−) 110 volt refund conductor, through rest contacts 352, the filament of lamp L21, the winding of coin assist relay 270, operated contacts 231, coin control conductor CC, operated contacts 832 and 839 in parallel, conductors T and R in parallel, contacts 712 and 715 in parallel, contacts 622 and 625 in parallel, the local switch train and paystation 10 where the coin control mechanism is operated to refund the coin.

Coin slave relay 460 does not release immediately upon the opening of contacts 432, but depends upon its slow release characteristics to remain in an operated position for a brief interval. If the coin is not collected immediately, coin assist relay 270 operates in series with the coin refund circuit from (−) 110 volts to the coin ground at paystation 10. Relay 270 closes its contacts 471 thereby locking coin slave relay 460 in an operated position, this circuit being traced from ground (+), through operated contacts 471, 463, 362 and the winding of relay 460 to (−) battery.

Lockout relay 450 operates to its "X" or preliminary contacts when contacts 433 are closed. Then, lockout relay 450 operates completely. Now, it is held over a circuit which may be traced from (−) battery, through the winding of relay 450, operated contacts 454, 452 and 465 to ground (+). Contacts 451 open the original energizing circuit for coin slave relay 460.

When ground is removed from the 60 i.p.m. conductor, the circuit for operating coin interrupt relay 430 is opened so that it releases. This opens the alternate holding path for start relay 440 at contacts 431. An alternate holding path for coin slave relay 460 is closed at contacts 432. The (−) 110 volt coin refund voltage is removed from the coin control conductor CC at contacts 231. Coin assist relay 270 restores. This opens an alternate holding circuit for relay 460 at contacts 471. Thereafter, coin slave relay 460 is held dependent upon the continuation of ground from contacts 432.

When the next pulse appears on the 60 i.p.m. conductor, the cycle of operation is repeated. This cycle continues to be repeated until the coin at paystation 10 has been refunded and responsive thereto coin ground is removed from the line at paystation 10. When this happens, coin assist relay 270 does not reoperate during the next 60 i.p.m. ground pulse. Hence, there is no locking path from contacts 471 for coin slave relay 460. It releases. This opens contacts 461 to remove the 60 i.p.m. conductor from its connection with coin interrupt relay 430. The circuit for primary delay relay 380 is opened at contacts 262. One of the alternate paths for coin tone is opened at contacts 261. One of the alternate holding paths for start relay 440 is opened at contacts 462. Contacts 465 open one of the holding paths for lockout relay 450. Primary delay relay 380 remains operated for a few milliseconds as the result of its slow release characteristics. Start relay 440 releases. This removes an alternate ground from the start conductor. Primary delay relay 380 restores. At contacts 381 the release alarm conductor is reconnected to prepare for the release of coin control selector 24 at a later time. Contacts 181 open to remove one of the ground markings from cutoff conductor CO. Thereafter, the ground applied to cutoff conductor CO is under the exclusive control of pulse relay 110 which controls at its contacts 311 the release of cutoff relay 220, hence the application of ground at contacts 221.

*Operator releases coin refund key.*—When the operator at the distant exchange releases her coin refund key, she removes the high resistance which was placed in the loop including conductors CCT and CCR. Thereafter, pulse relay 110 does operate. This opens contacts 312 thereby releasing cutoff relay 220 which restores. Ground is removed from the start conductor at contacts 421. Lockout relay 450 is restored when contacts 423 open. Tone is removed from coin tone conductor CT when contacts 222 open. From this point the circuit continues to function in the manner described above in the section entitled "Coin Collect."

*Stuck coin.*—Occasionally a coin is not immediately disposed of by the paystation collecting mechanism. In this case the operator continues to hear a tone which is applied from one of the tone conductors through contacts 371 or 172 and contacts 171, 222, conductor CT, operated contacts 835, the lefthand winding of repeat coil RC81, and operated contacts 837 to ground (+). Coin collect relay 150 is connected to ground (+) at contacts 141 which are held under the influence of start relay 440. Coin interrupt relay 430 and coin assist relay 270 continue to operate in the cycle described above thus holding start relay 440 in an operated condition. This pulse-like application of coin control potential shakes the coin mechanism at paystation 10. Eventually, the coin is shaken out of the hopper and the application of control potential is terminated when coin ground is removed.

*Release of coin control selector 24.*—After coin control has been completed, the operator at position 40 releases coin control selector 24 by removing the plugged cord at position 40 which is associated with coin control trunk line 26. This opens a loop across conductors CCT and CCR, thus restoring pulse relay 110 and coin refund relay 120. At contacts 312 a circuit is completed for starting the heating of thermistor TH21 over the following path: ground (+), contacts 312, 161, 214, 133, thermistor TH21 and the winding of cutoff relay 220 to (−) battery. However, cutoff relay 220 does not operate this time since the heating time for thermistor TH21 is such that coin refund relay 120 releases before cutoff relay 220 may operate. That is, coin refund relay 120 releases and opens contacts 121 to release second coin refund relay 130. This, in turn, opens contacts 133 to terminate the heating of thermistor TH21.

Release delay relay 360 is deenergized and released shortly thereafter when contacts 311 and 331 are opened. Monitor lamp MON (Fig. 3) is extinguished when contacts 361 open. Contacts 362 open to disconnect coin slave relay 460. Release magnet R is connected to the release alarm conductor through contacts 363, 381, PON31 and SON31 in parallel, the winding of release magnet R and (−) battery. Release magnet R operates and releases the switch mechanism to restore the primary and secondary off-normal springs PON and SON which returns the circuit to normal.

*Release.*—After the conversation is terminated the equipment may be released when the subscriber at paystation 10 hangs-up. In this case the circuit to calling bridge relay 730 is broken. Formerly, this circuit extended from (−) battery, through the lower winding of relay 730, rest contacts 762, 834, the lower lefthand winding of repeat coil RC81, rest contacts 838, conductor R, operated contacts 715 and 625, conductor R, the local switch train, paystation 10 and return through the local switch train, conductor T, operated contacts 622, 712, conductor T, rest contacts 831, the upper lefthand winding of repeat coil RC81, rest contacts 833, 761 and the upper winding of calling bridge relay 730 to ground (+). When this loop is broken at paystation 10, calling bridge relay 730 restores. Contacts 1232 open to release helping sleeve relay 820. When this relay restores, it closes contacts 823 thereby replacing an idle line termination including capacitor C81 and resistor R81 across the lefthand winding of repeat coil RC81. Contacts 822 open and 821 close thereby switching conductor M from (−) battery to ground (+). This ground (+) marking is extended through the upper winding of signal relay 840 and impedance I81 to conductor R3. This informs the operator at position 40 of the fact that the call has been completed and that she should disconnect. Contacts 1231 open but relay 1240 is held by contacts 1222 until the operator disconnects at which time supervisory relay 720 restores to open contacts 1222 and release delay relay 1240 restores.

Figure 12:
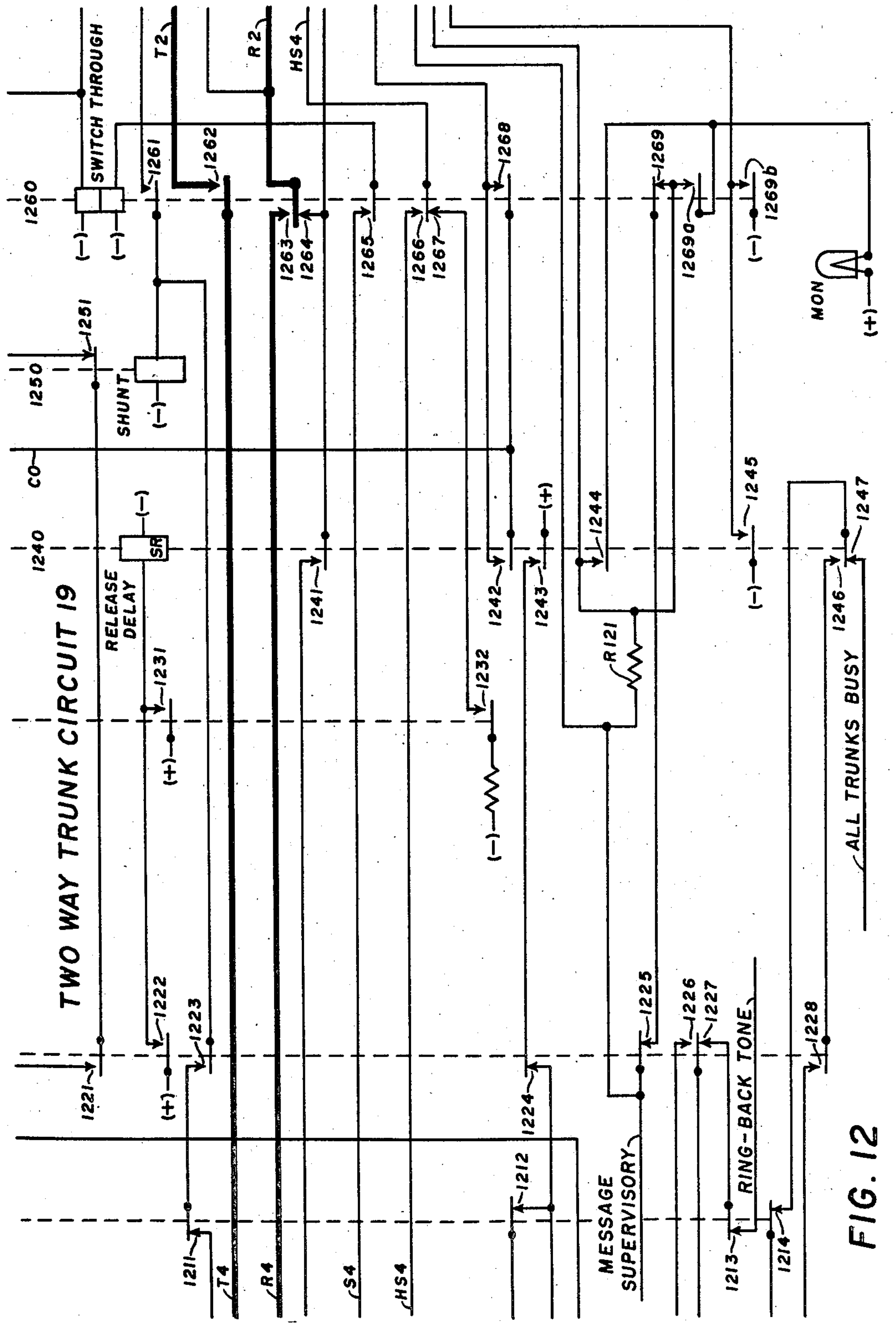

When release delay relay 1240 restores, it opens its contacts 744 thereby terminating the application of master ground which holds certain relays operated, such as relays 620 and 710, for example. They release. Contacts 741 release the preceding switch train. Contacts 1244 open to extinguish monitor lamp MON (Fig. 12). Contacts 1247 close to return a ground marking to the all-trunks-busy conductor.

The trunk circuit is now released completely and is ready for the next call.

INCOMING CALL

The next call to be described is one which is incoming to trunk circuit 19. It is destined for a called subscriber in the local exchange. For example, referring to Fig. 1*a*, this call may be placed by an operator at position 40 and may be destined for a subscriber at paystation 23. In this case, the call is extended over trunk 25 to two-way trunk circuit 19 which has access to any suitable local incoming selector 20. A suitable train of digit pulses is transmitted to cause incoming selector 20 to seize a local and toll connector 21 which may be used to complete the call. These features are shown in detail in the various circuit drawings. For example, trunk line 25 is incoming to the upper righthand corner of Fig. 8; two-way trunk circuit 19 is shown in Figs. 6, 7, 8, 11 and 12; incoming selector 20 is shown by a block in the upper portion of Fig. 11; local and toll connector 21 is shown in Figs. 5, 9, 10 and 13; and line circuit 22 and paystation 23 are shown in the lower lefthand portion of Fig. 6.

*Seizure.*—Trunk circuit 19 is seized on incoming calls when the operator at position 40 marks conductor R3 in any suitable manner (not shown). This marking is extended through impedance I81, the upper winding of signal relay 840, conductor M, and rest contacts 821 to ground (+). When the current flows in this direction, differential signal relay 840 operates to close its contacts 841. Responsive thereto, a ground (+) marking is extended over contacts 742 to operate pulse relay 810 via its lower winding.

On operating, relay 810 closes its contacts 811 thereby operating switchthrough relay 1260. Also, contacts 813 are closed to complete part of a loop circuit.

When switchthrough relay 1260 closes its contacts 1262 and 1263, a direct current loop is completed for operating a suitable calling bridge relay in incoming selector 20. This loop extends from conductor T4 through operated contacts 1262, 831, the upper lefthand winding of repeat coil RC81, rest contacts 833, resistor R72, operated contacts 763, rest contacts 834, the lower lefthand winding of repeat coil RC81, rest contacts 838, conductor R2, operated contacts 813, 1263 and conductor R4 to incoming selector 20. This loop causes incoming selector 20 to prepare for dial pulsing. Contacts 761 and 762 open to disconnect calling bridge relay 730. It is not required on incoming calls. Contacts 764 close to prepare part of a path for shunting the inductance of repeat coil RC81. This path is to be completed when digit pulses are received. Contacts 765 close to extend a ground (+) marking to the sleeve via busy key contacts BK62. This marks the trunk circuit busy to the local switch train having access over cable 18. Contacts 766 open to terminate the ground (+) marking normally extended to the all-trunks-busy conductor. This marking formerly extended from ground (+), through now operated contacts 766, busy key contacts BK61, rest contacts 1214 and 1247 to the all-trunks-busy conductor. Contacts 1261 close to prepare part of the circuit to operate shunt relay 1250 during the receipt of digit pulses. Switchthrough relay 1260 locks by way of its lower winding and contacts 1265 so that it may be held during incoming digit pulsing from incoming selector 20 over sleeve conductor S4. Contacts 1264 open a circuit which is used on outgoing calls for the transmission of ring-back and paystation tone. Contacts 1266 close to complete certain toll marking features. These features include the extension of ground (+), through contacts 839*a*, the upper winding of helping sleeve relay 820, operated contacts 1266 and extra sleeve conductor HS4. Also, a (−) battery toll marking may be extended over this circuit from contacts 1269*b* after the circuit has been switched through. Contacts 1268 close to prepare for the operation of cutoff relay 830 during coin control, if required. Contacts 1269 open and 1269*a* close thereby causing monitor lamp MON (Fig. 12) to glow brightly as an indication that the trunk circuit has been seized but the call has not been answered as yet. The circuit for this feature extends from ground (+), through the filament of monitor lamp MON, operated contacts 1269*a*, rest contacts 824 and the message supervisory conductor to a (−) battery (not shown).

*Dialing.*—Nothing further happens until the operator at position 40 transmits suitable digit pulse trains for setting incoming selector 20 to seize a local connector, such as connector 21, for example. Each digit pulse comprises a suitable break in the signal current extended over conductor R3 for operating signal relay 840. This relay responds to each break by releasing. Following each break the relay reoperates. For example, if the digit "7" is transmitted, contacts 841 open and close, pulse fashion, seven times. Responsive to each of these open-and-close cycles, pulse relay 810 is released and reoperated to repeat a digit pulse to incoming selector 20. That is to say, pulsing contacts 813 are opened and closed to repeat each digit pulse to operate a calling bridge relay (not shown) in selector 20. Switchthrough relay 1260 is deenergized at contacts 811 each time that pulse relay 810 restores. However, relay 1260 continues to hold throughout digit pulsing due to the circuit through its lower winding and locking contacts 1265; hence it is held depending upon ground returned from incoming selector 20 over conductor S4.

The first time that pulse relay 810 drops back, contacts 812 close to operate shunt relay 1250. The circuit for operating this relay may be traced from (−) battery, through the winding of relay 1250, operated contacts 1261 and release contacts 812 to ground (+). Shunt relay 1250 closes its contacts 751 thereby completing a short circuit across repeat coil RC81. This short circuit may be traced from conductor T, through the upper lefthand winding of repeat coil RC81, rest contacts 833, resistor R72, operated contacts 763, rest contacts 834, the lower lefthand winding of repeat coil RC81, rest contacts 838, operated contacts 751 and 764 to conductor T, contacts 831 and the upper lefthand winding of repeat coil RC81. This short circuit improves the pulsing characteristics over conductors T4 and R4 to incoming selector 20. Each time that pulse relay 810 reoperates following the termination of a digit pulse, shunt relay 1250 is deenergized; however, it continues to be held throughout pulsing due to its slow release characteristics. After receipt of the last digit pulse, contacts 812 remain open long enough for shunt relay 1250 to restore.

The next digit pulse train is transmitted. This digit pulse train again causes the operation of signal relay 840, pulse relay 810 and shunt relay 1250, all in the manner described above. However, this time the digit pulses are effective for setting connector 21 instead of incoming selector 20.

Figure 11:
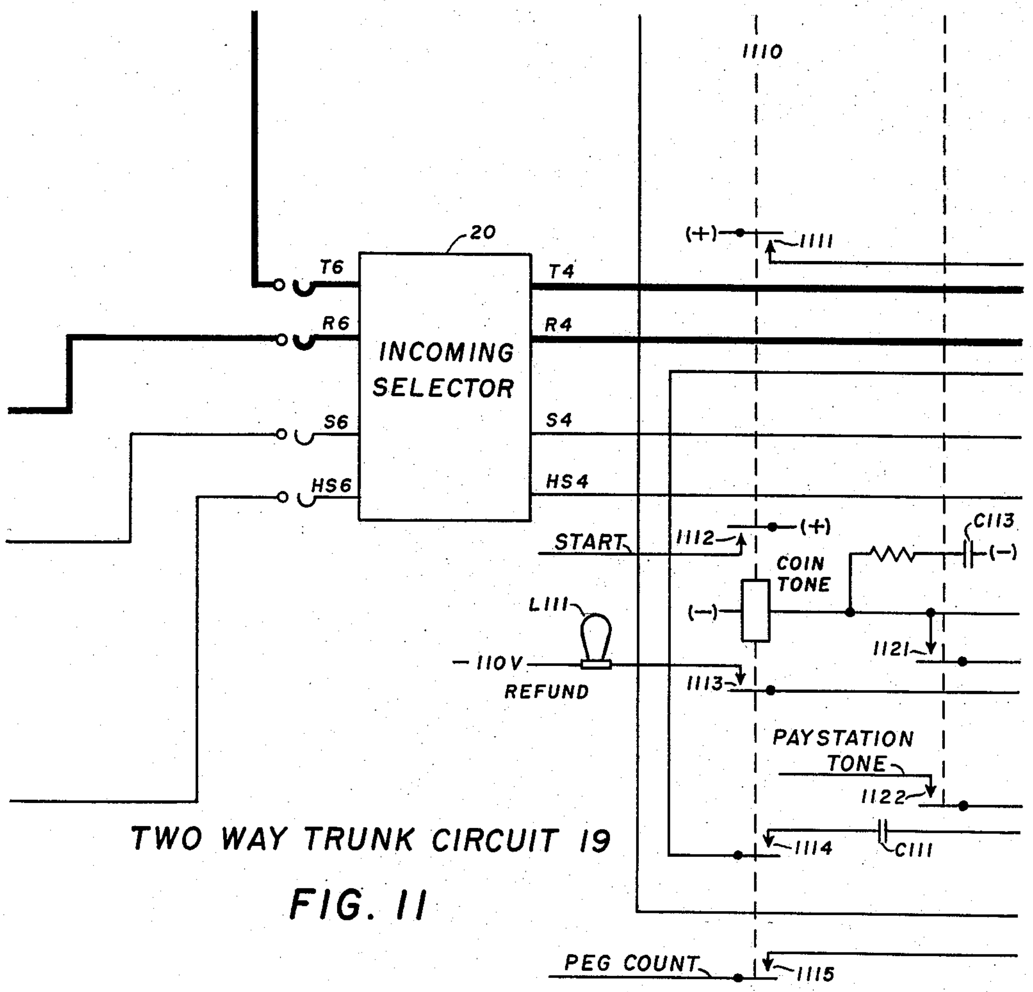

*Connector seizure.*—More particularly, it is assumed that incoming selector 20 has been directed to seize the connector over a point of access which is shown in the upper lefthand corner of Fig. 11. Responsive thereto, a loop is completed for operating calling bridge relay 520. This loop may be traced from (−) battery, through the lower winding of calling bridge relay 520, rest contacts 913, 1094, conductor R6, incoming selector 20, conductor R4, operated contacts 1263, 813, conductor R2, contacts 838, the lower lefthand winding of repeat coil RC81, contacts 834, operated contacts 763, resistor R72, rest contacts 833, the upper lefthand winding of repeat coil RC81, rest contacts 831, conductor T2, operated contacts 1262, conductor T4, incoming selector 20, conductor T6, rest contacts 691 and 511 to ground (+) through the upper winding of calling bridge relay 520.

Calling bridge relay 520 operates and closes its contacts 921 thereby operating release delay relay 1330. The circuit for this operation may be traced from (−) battery, through the winding of release delay relay 1330, operated contacts 921 and release interrupter contacts RE92 to ground (+). Contacts 923 close thereby lighting monitor lamp MON (Fig. 13) brightly, as an indication that the connector has been seized but has not switched through as yet. The circuit for this function may be traced from ground (+), through the filament of lamp MON (Fig. 13), operated contacts 923, rest contacts 918 and the message supervisory conductor to (−) battery (not shown).

Release delay relay 1330 operates. Contacts 1031 close to mark the connector busy to all other equipment and to hold preceding equipment. The circuit for this marking may be traced from contacts 1031 over conductor S6 to the multiples of the rank of selectors including selector 20. Contacts 1032 close to prepare part of the operating path for switchthrough relay 1080; however, it does not operate until the idle called line has been seized. Contacts 1033 close to prepare part of the circuit for ring trip relay 1360. Contacts 1332 close to apply ground to master ground conductor MG′. This is the conductor to which most of the equipment in the connector is locked when in an operated condition. Contacts 1334 close to prepare the pulsing circuit.

A circuit is now completed for operating primary delay relay 1350. The purpose of this relay at this time is to mark the end of the first digit pulse train. Later it is reused to mark the end of the second pulse train. The circuit for operating this relay may be traced from ground (+) applied at contacts 1332, primary off-normal contacts PON131 and the upper winding of primary delay relay 1350 to (−) battery. Primary delay relay 1350 operates and contacts 551 open a point in the circuit to the busy tone conductor. Contacts 1051 open but they have no function at this time. Contacts 1053 close to prepare part of the busy test circuit. As will be explained presently, this feature is used later in the call during a reuse of relay 1350 and is not used at this time. Contacts 1054—1057 relate to coin control features which will be explained presently. Contacts 1351 relate to control of ring trip relay 1360 at the end of the first digit. Contacts 1352 close to prepare for the receipt of digit pulses by completing a stepping circuit.

Ring trip relay 1360 is energized over a circuit which may be traced from ground (+), through release magnet interrupter contacts RE92, operated contacts 921, secondary off-normal contacts SON91, primary off-normal contacts PON133 and the lower winding of relay 1360 to (−) battery. This relay is operated at this time to provide means for controlling the transfer of the pulsing contacts from the primary to the secondary stepping circuits at the end of the first digit pulse train.

*Primary switch motion.*—The circuit is now ready for the receipt of digit pulses and nothing further happens until the operator at position 40 dials. These pulses are repeated at contacts 813 by pulse relay 810. Responsive to the receipt of each digit pulse, calling bridge relay 520 is released to close its pulsing contacts 922. The pulsing circuit extends from ground (+), through release magnet interrupter contacts RE92, pulse contacts 922, operated contacts 1333, operated contacts 1352, operated contacts 1367 and the winding of primary magnet P to (—) battery. The switch operates responsive thereto and takes one step in its primary direction thereby opening the primary off-normal contacts PON133 and PON131 while closing contacts PON134 and PON132. When primary off-normal contacts PON131 open, they break the path over which primary delay relay 1350 was originally operated. However, it should be noted that each time that a digit pulse is received, energizing current is extended from ground (+) over contacts RE92, 922, 1333, 1352 and the lower winding of relay 1350 to (—) battery. Since primary delay relay 1350 is a slow release relay, it continues to hold throughout digit pulsing. After the last digit pulse is received, relay 1350 will release. Secondary off-normal contacts PON133 break the path over which relay 1360 operated.

During the digit pulsing and while relay 1350 is operated, a circuit is completed from (—) battery, through the lower winding of ring trip relay 1360, operated contacts 1363, 1351, 1362, secondary off-normal contacts SON133, and contacts 1332 to ground (+). This holds ring trip relay 1360 operated throughout the digit pulse train. After primary delay relay 1350 releases following the first digit pulse train, contacts 1351 open thus restoring ring trip relay 1360. Contacts 1366 close while contacts 1367 open thereby transferring the pulsing path from connection with primary magnet P to connection with secondary magnet S.

A circuit is completed for reoperating primary delay relay 1350. This circuit may be traced from (—) battery, through the upper winding of relay 1350, operated primary off-normal contacts PON132, rest contacts 1361, rest secondary off-normal contacts SON133 and operated contacts 1332 to ground (+).

*Secondary switch motion.*—The switch is now prepared to receive the second series of digit pulses to be transmitted into the connector from operator position 40. Again, these digit pulses are repeated at contacts 813. Calling bridge relay 520 restores responsive to each pulse. Again, contacts 922 close to complete the stepping path which extends from ground (+), through resting release interrupter contacts RE92, rest contacts 922, operated contacts 1333 and 1352 to (—) battery through the lower winding of primary delay relay 1350. Simultaneously therewith, a circuit is completed from ground (+), through contacts RE92, 922, 1333, 1352 and 1366 to (—) battery through the winding of secondary magnet S. Responsive thereto, the switch takes its first step in the secondary direction. This opens secondary off-normal contacts SON133 while closing secondary off-normal contacts SON134 and SON132. The circuit over which primary delay relay 1350 originally operated before the second digit pulse train is broken when contacts SON133 open. Thereafter, this relay is held in an operated position depending upon the periodic completion of the pulsing circuit.

As each digit pulse is received, secondary magnet S is operated to drive the switch one step in its secondary direction. At the completion of this digit pulse train, wipers T7, R7, S7 and HS7 are left standing on the called line terminals.

*Toll marking.*—If the call is incoming from a toll office, a toll marking is extended from trunk circuit 19 to operate toll marking relay 910. This marking may be traced through Fig. 15 or through the detailed drawings. They are both the same at this point. The toll marking may be traced from (—) battery, through the upper winding of relay 910, rest contacts 912*a*, operated contacts 1074 (or if the line is not busy contacts 1087), contacts 1057, conductor HS6, incoming selector 20, conductor HS4, operated contacts 1266, the upper winding of helping sleeve relay 820 and contacts 839*a* to ground (+). Contacts 911*a* and 913*a* close to prepare part of the circuit for controlling helping sleeve relay 1040. Contacts 914*a* close to lock toll marking relay 910 in an operated condition. This circuit is from (—) battery, through the lower winding of relay 910, contacts 914*a* and contacts 1332 to ground (+). It might be noted that contacts 914*a* are "X" or preliminary contacts which are adapted to close before contacts 912*a* open so that the locking circuit is completed before the original energizing circuit is broken.

On local calls where there is no toll marking superimposed upon conductor HS6, toll marking relay 910 does not operate. This is so that subscribers calling through the local switch strain may not cause metallic switch-through to the called line. For an example of this type of a call see Fig. 1*a* where a call may be traced from paystation 10 to line circuit 11, line finder 12, paystation adapter 13, first local selector 14, second local selector 16, local and toll connector 21, line circuit 22 and paystation 23.

*Busy test.*—Primary delay relay 1350 continues to be held briefly after the line is reached due to its slow release characteristics. If the line is busy a circuit is completed for returning busy tone during this interval while relay 1350 is held. More particularly, if paystation 23 is busy, other equipment (not shown) functions to return a ground (+) marking over conductor S7, operated contacts 1053 (during relay 1350's slow release period), rest contacts 1085, the upper winding of busy test relay 1070, and release magnet interrupter contacts RE131 to (—) battery. This causes busy test relay 1070 to operate. It closes its contacts 1073 thereby locking over a circuit which may be traced from (—) battery, through release magnet interrupter contacts RE131, the upper winding of busy test relay 1070, rest contacts 1085, 1052, 1064, operated contacts 1073 and 1032 to ground (+). Contacts 571 close to return busy tone to the calling subscriber. This circuit may be traced from the busy tone conductor through operated contacts 571, rest contacts 551, 582, the upper winding of answer bridge relay 510, and then to the calling subscriber over the talking conductors. Contacts 1071 close to provide a feature for marking connector 21 as busy to other incoming selectors. Nothing further happens until the calling subscriber hangs up at which time the circuit is released in the manner described hereinafter in the section entiled "Release."

The operator at position 40 is given a busy signal when 60 i.p.m. ground is connected to trunk circuit 19 to flash a lamp at the position. Reference may be made to Fig. 15, if desired. In greater detail, alternate pulses or flashes of direct ground and battery on the 60 i.p.m. lead is connected by way of contacts 1076, 1089, 1054, 911*a*, through the upper winding of relay 1040, contacts 913*a*, 1074, 1057, conductors HS6 and HS4, contacts 1266 and through the upper winding of relay 820 to ground (+) on contacts 839*a*. On each battery pulse that is received over this circuit, relay 820 operates. This changes conductor M from (—) battery to ground (+) at contacts 821 and 822 thus causing a pulsing signal to be sent back to the calling operator via the upper winding of signal relay 840, impedance coil 181 and conductor R3.

*Called line idle.*—On the other hand, if it is assumed that the called line is idle when the busy test is made, (—) battery is placed (by equipment, not shown) upon conductor S7 for operating switchthrough relay 1080 after primary delay relay 1350 has released following the termination of the last digit pulse. This circuit may be traced from conductor S7 through rest contacts 1051, the upper winding of switchthrough relay 1080, rest contacts 1072 and operated contacts 1032 to ground (+). Switchthrough relay 1080 closes contacts 581 and 1082 to prepare for ringing. That is, a circuit may be traced from ground (+), through contacts 561, 693 and 581 to tip conductor T7, line circuit 22, paystation 23 and return through line circuit 22, ring conductor R7, contacts 1082, 1092, 1062 and the upper winding of ring trip relay 1360 to contacts 1372 and 1033 to battery. Contacts 1081 close to transmit ring-back tone as an indication that the call has been completed and that the called party is being signaled. This circuit may be traced from the ring-back tone conductor through contacts 1081, 1061, capacitor C91, rest contacts 913, 1094, conductor R6 and over the talking conductor to the calling operator. The ringing generator is started when contacts 1382 close. A busy marking ground is returned over conductor S7 from contacts 1083 thereby marking paystation 23 as busy to other connectors.

A circuit is completed for operating busy test relay 1070. It might be noted that this case is different from a busy test condition since switch through relay 1080 has operated. This circuit may be traced from (−) battery, through release magnet interrupter contacts RE131, the winding of busy test relay 1070, operated contacts 1084, rest contacts 1065, conductor HS7 and line circuit 22 to ground (+) (not shown). When busy test relay 1070 operates, it extends ringing current from the generator conductor through contacts 1371, the upper winding of ring trip relay 1360, contacts 1062, 1092, 1082, conductor R7, paystation 23, and return on conductor T7, contacts 581, 693 and 561 to ground (+). Contacts 1072 open to break the original energizing circuit for switch-through relay 1080; however, it has already locked to master ground from (−) battery through its lower winding, operated "X" or preliminary contacts 1381 and 1332 to ground (+). Relay 1070 may not operate to break the original circuit at contacts 1072 before switchthrough relay 1080 has locked because contacts 1381 are arranged to make before contacts 1084.

*Answer supervision.*—The called subscriber station has been seized and is being rung. When he answers, ring trip relay 1360 operates. The operating circuit for this relay may be traced from a (−) battery (not shown) superimposed upon the generator conductor and extended through operated contacts 1371, the upper winding of ring trip relay 1360, rest contacts 1062, 1092, operated contacts 1082, conductor R7, line circuit 22, paystation 23 where hook switches complete a D.C. path responsive to the subscriber's answer, and return through line circuit 22, conductor T7, operated contacts 581, rest contacts 693 and 561 to ground (+). Ring trip relay 1360 operates to its "X" or preliminary contacts 1363. A circuit is completed from (−) battery through the lower winding of relay 1360, operated contacts 1363, SON134, and 1332 to ground (+). This preliminary circuit causes ring trip relay 1360 to operate fully. Contacts 562 and 1063 close to extend the talking conductors while contacts 561 and 1062 open to remove the ringing current from its application to called station 23. Contacts 1061 remove ring-back tone. Busy test relay 1070 is released when contacts 1065 open. Contacts 1365 open to remove the ground (+) applied to the start conductor thereby deenergizing the interrupter.

Answer bridge relay 510 operates over a circuit which may be traced from (−) battery, through the lower winding of relay 510, operated contacts 584, 1063, 1092, 1082, conductor R7, the D.C. loop completed through line circuit 22 in paystation 23, conductor T7, operated contacts 581, rest contacts 693, operated contacts 562, the upper winding of answer bridge relay 510, and operated contacts 583 to ground (+). Answer bridge relay 510 reverses the direction of battery flow at its contacts 511, 512, 912 and 913 thereby returning answer supervision over conductors T6 and R6. This feature is used when the connector is seized on a local call but has no function when the connector is used on toll calls.

Answer bridge relay 510 operates to return answer supervision to the operator at position 40. The circuits described in this paragraph may be traced through the detailed drawings or through Fig. 15, whichever is most convenient for the reader. More particularly, a circuit is completed for differentially energizing helping sleeve relay 1040 and for operating helping sleeve relay 820. Since helping sleeve relay 1040 is differentially energized, it does not operate at this time. The differential energization is by way of a circuit which may be traced from ground (+), through the lower winding of relay 1040, contacts 911*a*, 1054, 1088, 914 and 1033 to (−) battery and through the upper winding over a path which may be traced from (−) battery, through contacts 1033, 914, 1088, 1054, 911*a*, the upper winding of relay 1040, contacts 913*a*, 1087, 1057, conductor HS6, incoming selector 20, conductor HS4, operated contacts 1266, the upper winding of helping sleeve relay 820, and rest contacts 839*a* to ground (+). Relay 820 is energized over the upper winding only; therefore, it operates. Responsive thereto, contacts 823 open to remove the idle line termination including capacitor C81 and resistor R81. Normally, this termination is connected across the lefthand windings of repeat coil RC81. Contacts 821 open and 822 close thereby switching conductor M from the normal ground (+) marking to (−) battery marking. This marking returns answer supervision to the operator at position 40. Contacts 824 open to cause monitor lamp MON (Fig. 12) to glow dimly. This is an indication that the trunk circuit has switched through and that the call has been answered. The circuit for causing this lamp to glow dimly may be traced from ground (+), through the filament of monitor lamp MON, operated contacts 1269*a*, resistor R121 and the message supervisory conductor to (−) battery (not shown).

Returning to the operation of relay 510, contacts 916 close to provide an alternate ground for conductor MG'. This feature is provided to hold the equipment busy until the last party releases. Contacts 918 open thereby causing monitor lamp MON (Fig. 13) to glow dimly as an indication that the call has been answered. The circuit for this feature may be traced from ground (+), through the filament of lamp MON, operated contacts 923, resistor R91 and the message supervisory conductor to (−) battery (not shown).

The call is now completed and conversation may be carried on.

*Coin control in connector.*—On occasions it may be necessary for the operator to control the disposition of coins at paystation 23. For example, it may be that the call was placed on a reverse charge basis. In this case, the subscriber at paystation 23 is notified of the call and is asked whether he will pay the toll charge. If so, he deposits coins at paystation 23 and the operator position 40 proceeds to collect them.

Referring first to Fig. 1*a*, the operator at position 40 seizes coin control trunk line 26 and causes coin control selector 24 to seize trunk circuit 19. Responsive thereto, the operator has control over the disposition of coins at paystation 23 by way of the switch train including coin control selector 24, incoming selector 20, connector 21, line circuit 22 and paystation 23.

The operation of coin control selector 24 is explained above in the section entitled "Coin Control." Cutoff relay 830 and helping sleeve relay 820 are operated. Responsive thereto, contacts 839*a* open and 839*b* close to switch the marking extended through helping sleeve relay 820 from ground (+) to (−) battery. A circuit may be traced from (−) battery, through contacts 1269*b*, 839*b*, the upper winding of helping sleeve relay 820, contacts 1266, conductor HS4, incoming selector 20, conductor HS6, rest contacts 1057, operated contacts 1087 and 913*a*, through the upper winding of helping sleeve relay 1040, operated contacts 911*a*, rest contacts 1054, operated contacts 1088, 914 and 1033 to (−) battery. The upper winding of relay 1040 is now shunted by (−) battery which is now applied to both sides of it.

The relay is no longer differentially energized. It operates and closes contacts 1341. A circuit is completed for operating metallic relay 1090. This circuit may be traced from (—) battery, through the winding of relay 1090, operated contacts 1341 and 1364 to ground (+). Relay 1090 closes contacts 692, 694, 1093 and 1095. This completes a direct metallic connection from conductor R6 to conductor R7 and from conductor T6 to conductor T7 thereby shunting capacitors C51, C91, the inductance of calling bridge relay 520 and answer bridge relay 510. This provides a direct metallic circuit from the trunk circuit to the paystation for applying coin control potential. Contacts 695 close to connect the tip and ring conductors together to hold calling bridge relay 520 operated during coin control. Furthermore, contacts 695 are preliminary so that they hold relay 520 before contacts 691 and 1094 break the original path to relay 520. Contacts 1091 close to hold answer bridge relay 510 in an operated condition during coin control. The circuit extends from (—) battery, through the lower winding of relay 510, operated contacts 584, 1063, 1091, 911, resistor R92, the upper winding of relay 510, and operated contacts 583 to ground (+). Again, contacts 1091 are "X" or preliminary to provide a positive hold feature.

As was explained above in the section entitled "Coin Control," the operator at the distant exchange operates coin control selector 24, thus extending collect or refund battery, as the case may be, over conductors CC to trunk circuit 19. A circuit may be traced from conductor CC through contacts 832 and 839 in parallel, conductors T2 and R2, contacts 813, contacts 1262 and 1263 in parallel, conductors T4 and R4, incoming selector 20, conductors T6 and R6, contacts 692 and 1095 in parallel, contacts 694 and 1093 in parallel, contacts 581 and 1082 in parallel, and conductors T7 and R7 to paystation 23 by way of line circuit 22.

Helping sleeve relay 1040 releases at the end of coin control when cutoff relay 830 releases to close contacts 839*a* while opening contacts 839*b*. This replaces (—) battery by ground (+) on conductor HS4 so that helping sleeve relay 1040 is differentially energized. It releases contacts 1341 and hence metallic relay 1090. After this the talking circuit includes capacitors C51 and C91.

Aside from the features just explained, coin control through connector 21 is the same as the coin control which was previously explained in connection with a call from paystation 10.

*Release.*—The sequence of events at the end of the call depends upon which party hangs up first. If it is assumed that the called party at paystation 23 is the first to hang up, answer bridge relay 510 restores. It might be recalled that this relay operated in series with the hookswitch at station 23 over a circuit which may be traced from (—) battery, through the lower winding of answer bridge relay 510, operated contacts 584, 1063, rest contacts 1092, operated contacts 1082, conductor R7 through line circuit 22, paystation 23 and return through line circuit 22, conductor T7, operated contacts 581, rest contacts 693, operated contacts 562, the upper winding of answer bridge relay 510 and operated contacts 583 to ground (+). Contacts 916 remove an alternate ground applied to master ground conductor MG′ while contacts 918 close thereby lighting monitor lamp MON (Fig. 13) brightly as an indication that the call is no longer completed through connector 21 to a called subscriber. Answer bridge relay 510 returns contacts 511, 512, 912 and 913 to their normal position so that release supervision is returned to the local switch train if it was used in this call. Assuming that the call came in from a toll operator position, as explained above, contacts 914 open and 915 close thus switching conductor HS6 from (—) battery to ground (+). It might be recalled that formerly the (—) battery marking was extended through contacts 1033. A circuit may now be traced from ground (+), through resting contacts 915, operated contacts 1088, rest contacts 1054, operated contacts 911*a*, the upper winding of helping sleeve relay 1040, operated contacts 913*a*, operated contacts 1087, rest contacts 1057, conductor HS6, incoming selector 20, conductor HS4, operated contacts 1266, the upper winding of helping sleeve relay 820 and rest contacts 839*a* to ground (+).

Helping sleeve relay 820 releases. Responsive thereto, contacts 821 close to return a ground (+) marking over conductor M, thus signalling the operator at the distant exchange of the fact that the called subscriber has hung up. Contacts 823 close to return the idle line termination to its normal connection across conductors T2 and R2.

Nothing further happens until the operator at position 40 releases the call. She does so by reversing the direction of battery flow over conductor R3. This causes signal relay 840 to release. Contacts 841 open to restore pulse relay 810. Responsive thereto, contacts 813 open to break the circuit extending to calling bridge relay 520. It might be recalled that calling bridge relay 520 was operated originally over a circuit which may be traced from (—) battery through the lower winding of relay 520, rest contacts 913, 1094, conductors R6 and R4, operated contacts 1263, contacts 813 (now open), contacts 838, the lower lefthand winding of repeat coil RC81, rest contacts 834, operated contacts 763, resistor R72, rest contacts 833, the upper lefthand winding of repeat coil RC81, rest contacts 831, conductor T2, operated contacts 1262, conductor T4, conductor T6, rest contacts 691, rest contacts 511, the upper winding of calling bridge relay 520 to ground (+).

Figure 13:
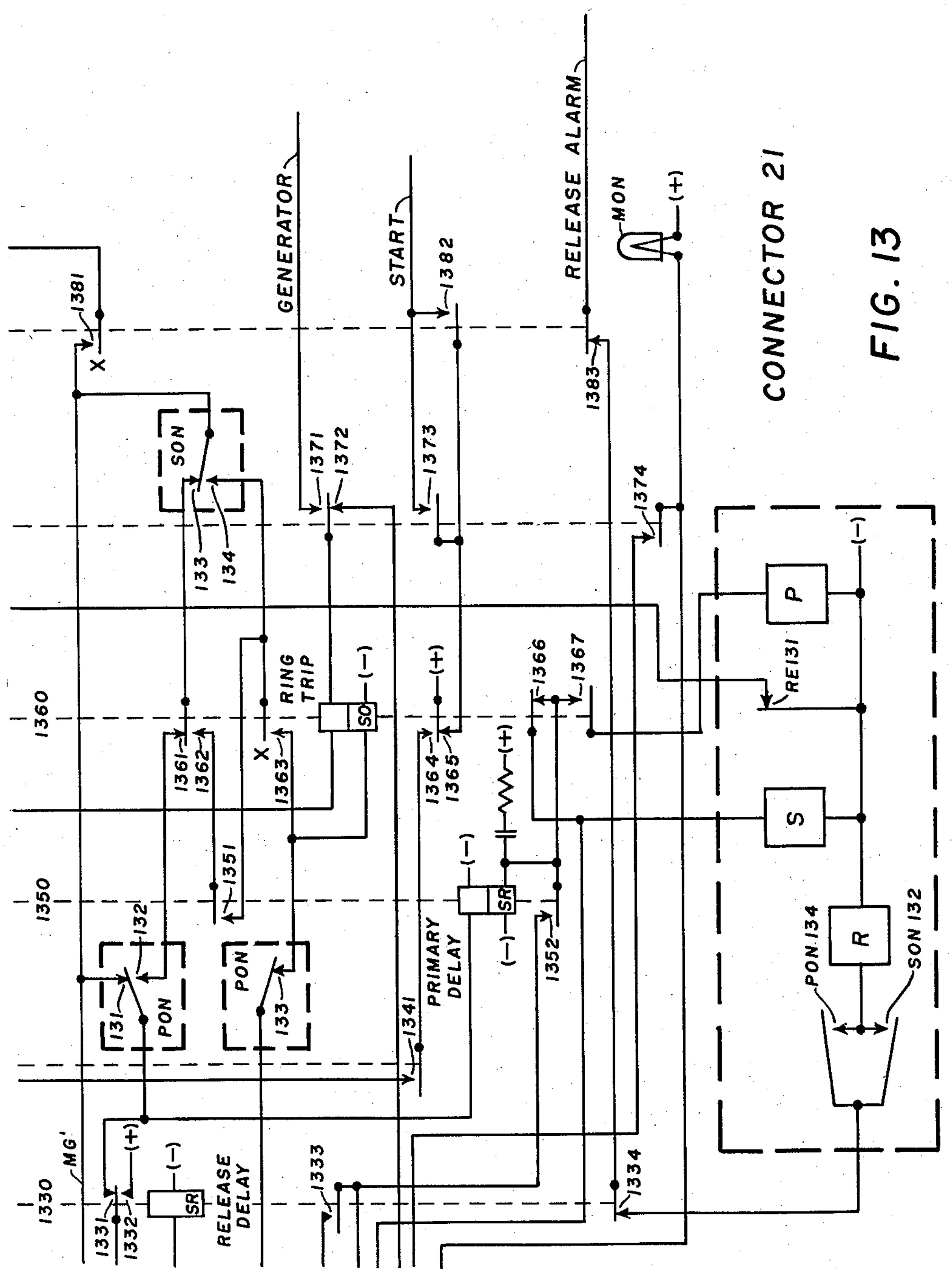

Relay 520 restores. Contacts 921 open thus releasing release delay relay 1330. Contacts 923 open to extinguish monitor lamp MON (Fig. 13). When release delay relay 1330 restores, contacts 1332 open thus removing ground (+) from the master ground conductor MG′. All of the relays which were locked to this ground release. For example, switchthrough relay 1080 had been locked to this ground by way of contacts 1381 and 1332. Contacts 1334 close to complete a circuit for releasing the connector switch. This circuit may be traced from ground (not shown) on the release alarm conductor through rest contacts 1383, 1334, operated contacts PON134 and SON132 in parallel, and the winding of release magnet R to (—) battery. Contacts 1031 open to remove the ground (+) marking from sleeve conductor S6. This ground was formerly extended from contacts 1031. Conductor S4 is no longer marked with a ground potential. The circuit through contacts 1265 to the lower winding of switchthrough relay 1260 is now broken. Switchthrough relay 1260 releases.

The circuit is now returned to normal and ready for the next call.

*Wink-off.*—If the situation is reversed and the operator at position 40 is the first to release, the operation is as explained above except for the "wink-off" or last party release feature wherein ground is removed from conductor S6 long enough to release the switch train and then reapplied to hold connector 21 and line circuit 22 busy until paystation 23 is restored to its on-hook condition. In this case, calling bridge relay 520 releases when the operator disconnects. Contacts 921 open and release delay relay 1330 restores. Contacts 1031 open to remove ground (+) from sleeve conductor S6. This releases all preceding equipment. Contacts 1331 close. Primary delay relay 1350 operates over the circuit from (—) battery, through its upper winding, rest contacts 1331, and operated contacts 916 to ground (+). This in turn closes a circuit to operate busy test relay 1070. This circuit extends from (—) battery, through release interrupter contacts RE131, the upper winding of busy test relay 1070, operated contacts 1084, 1066, 1053 and 1083 to ground (+). Busy test relay 1070 closes contacts 1071 to reapply a busy ground (+) to conductor S6 to mark connector 21 as busy to all other equipment until the called subscriber hangs up. At that time answer bridge relay 510 releases contacts 916. Switchthrough relay 1080 releases. It was locked over a circuit including its lower winding and contacts 1381 and 916. Contacts 1083 open to restore busy test relay 1070. Responsive thereto, contacts 1071 open and the connector is marked idle once more. Relay 1070 releases when release magnet R opens contacts R131.

*Busy test relay 1070*

It might be noted that busy test relay 1070 has been operated three times. First, it might be operated during the release time of relay 1350 to test for a busy line. This circuit is from (—) battery, through release magnet interrupter contacts RE131, the winding of relay 1070, contacts 1085, 1053 and conductor S7 to a busy ground. Second, relay 1070 may be used to control the application of ringing current at its contacts 1371. This circuit is effective after primary delay relay 1350 has released. This time busy test relay 1070 operates over a circuit which may be traced from (—) battery, through release magnet interrupter contacts RE131, the winding of relay 1070, contacts 1084, 1065 and conductor HS7 to line circuit 22 and ground (+) (not shown). This feature controls the application of ringing current to signal subscribers according to strappings applied to conductor HS7 in line circuit 22. When the called party answers, ring trip relay 1360 opens contacts 1065 to release this relay. Third, relay 1070 may be used to provide a last party release feature. This time it is operated over the circuit from (—) battery, through release magnet interrupter contacts RE131, the winding of relay 1070, operated contacts 1084, operated contacts 1066, 1053 and 1083 to ground (+).

FOURTH WIRE CONTROL

Fig. 15 shows, in skeletonized form, the fourth wire control which is shown in detail form in Figs. 5–13. For example, Fig. 15 shows helping sleeve relays 1040 and 820 together with the fourth wire circuit (conductors HS4 and HS6) which controls them. Relay 1040 is also shown in the lower lefthand corner of Fig. 10, while relay 820 is shown in the lower lefthand corner of Fig. 8. The various other relays and contacts which are shown in Fig. 15 are also shown in the detailed circuits.

Referring to Fig. 15 in greater detail, switchthrough relay 1260 operates when trunk circuit 19 is seized and is connected with the following incoming selector 20. Incoming selector 20 is operated to seize connector 21. This interconnects conductors HS6 and HS4. Release delay relay 1330 operates responsive to seizure of connector 21. If the call is one requiring toll supervision, toll marking relay 910 operates now if the line is busy or later if the line is idle. The present circuit extends from (—) battery through the upper winding of relay 910, contacts 912*a*, 1074, 1057, conductors HS6 and HS4, contacts 1266, the upper winding of relay 820 and contacts 839*a* to ground (+). If the called line is busy, busy test relay 1070 operates before switchthrough relay 1080. A circuit is then completed from 60 i.p.m. interrupter 1500 through contacts 1076, 1089, 1054, 911*a*, the upper winding of relay 1040, contacts 913*a*, 1087, 1057, conductors HS6 and HS4, contacts 1266, the upper winding of relay 820 and contacs 839*a* to ground (+). Each time that interrupter 1500 rotates, relay 820 operates and releases to flash the distant operator by means of its contacts 822 and 821.

Switchthrough 1080 operates if the called line is found to be idle. Responsive thereto, a marking is completed from ground (+) through rest contacts 839*a*, the upper winding of helping sleeve relay 820, operated contacts 1266, conductor HS4, incoming selector 20, conductor HS6, rest contacts 1057, operated contacts 1087, rest contacts 912*a*, and the upper winding of toll marking relay 910 to (—) battery. Relay 910 operates and closes contacts 913*a* thereby connecting helping sleeve relay 1040 to be controlled over conductors HS6 and HS4. Relay 1040 is not operated at this time because ground (+) is connected to all of its terminals. Its circuits may be traced from ground (+) through rest contacts 915, operated contacts 1088, rest contacts 1054, operated contacts 911*a*, and the lower winding of helping sleeve relay 1040 to ground (+). Another circuit may be traced through the upper winding of helping sleeve relay 1040, operated contacts 913*a*, 1087, 1057, conductors HS6 and HS4, operated contacts 1266, rest contacts 839*a* and ground (+). Nothing further happens until the called subscriber answers thereby operating answer bridge relay 510.

Contacts 914 close when the called subscriber answers. A circuit is completed from (—) battery, through operated contacts 1033, 914, 1088, rest contacts 1054, 911*a* and the upper and lower windings of helping sleeve relay 1040 to ground (+). The upper winding is connected to ground (+) by way of operated contacts 913*a*, 1087, rest contacts 1057, conductor HS6 conductor HS4, operated contacts 1266 and rest contacts 839*a*. Helping sleeve relay 1040 is differentially energized at this time and does not operate. However, helping sleeve relay 820 is operated over only its upper winding since ground (+) is connected to both terminals of its lower windings. Therefore, relay 820 does operate. This opens contacts 823 thereby removing idle line termination from trunk 25. Contacts 821 open and 822 close thereby returning answer supervision over trunk 25.

Later, during the sequence of establishing the call, it may be necessary to dispose of coins which are deposited in paystation 23. For this purpose, the operator controls cutoff relay 830 from coin control selector 24. Responsive thereto, contacts 839*a* open and 839*b* close. A circuit is now completed from (—) battery, through operated contacts 1269*b*, rest contacts 839*b*, and the lower winding of helping sleeve relay 820 to ground (+). In parallel therewith, the upper winding of helping sleeve relay 820 is connected to (—) battery via operated contacts 1266, conductor HS4, conductor HS6, rest contacts 1057, operated contacts 1087, 913*a*, the upper winding of helping sleeve relay 1040, contacts 911*a*, 1054, 1088, 914 and 1033 to (—) battery. It is obvious that the upper winding of helping sleeve relay 1040 is shunted since (—) battery is applied to both of its terminals. However, the lower winding continues to be energized from the battery applied at contacts 1033. Hence, helping sleeve relay 1040 is not differentially energized any longer so it operates. In doing so it closes contacts 1341 thereby completing the connector coin control feature.

The operated condition of helping sleeve relay 820 does not change since it is held energized over its lower winding, the circuit being from (—) battery through contacts 1269*b*, 839*b* and the lower winding of relay 820 to ground (+). The upper winding is shunted since both terminals extend to (—) battery.

After coin control is completed, the operator causes coin control selector 24 to release cutoff relay 830. This opens contacts 839*b* while closing contacts 839*a* to return conductors HS4 and HS6 to ground (+) in the trunk circuit. This causes helping sleeve relay 1040 to be differentially energized. Therefore, it releases.

After the called party has hung up, answer bridge relay 510 releases to open contacts 914 while closing contacts 915. This connects ground to conductors HS6 and HS4, hence to all terminals of helping sleeve relay 820. It releases. Contacts 823 close thus connecting the idle line termination to trunk 25. Contacts 822 open and 821 close to return on-hook supervision to the distant exchange.

MISCELLANEOUS

Various features have been shown but have not been explained thoroughly since they relate to features which are not pertinent to the invention. For example, various windings marked by the letters "NI" are noninductive so that the relay may not be operated when these windings are energized. Various monitor jacks are provided so that maintenance personnel may listen-in to determine how the circuit is functioning. The various make busy keys are for maintenance also; they are used to mark the particular circuit as busy to other equipment so that maintenance repair may be performed.

While I have shown only a single embodiment of my invention, I intend to include within the scope of the attached claims all modifications which fall within the true scope and spirit of my invention.

What is claimed is:

1. A telephone system comprising a two-way trunk circuit, a coin control trunk line, coin control means having access to said trunk circuit, means for controlling said coin control means over said coin control trunk line, conversation switching means, a conversation carrying trunk line, means for seizing said conversation switching means from said trunk circuit on calls which are incoming over said conversation trunk line, said trunk circuit having a single point of access for coin control, an operator's position, means responsive to control extended from said operator's position over said coin control trunk line for causing said coin control means to be connected directly to said point of access, and means including said last named means for controlling the disposition of coins on both incoming and outgoing calls which may be extended through said trunk circuit, and said conversation carrying trunk line.

2. The telephone system of claim 1 and means in said coin control means for returning verification tone from said coin control means through said two-way trunk circuit to said operator's position by way of said conversation carrying trunk line.

3. The telephone system of claim 2 wherein said conversation switching means includes a connector switch and four-wire means for interconnecting said conversation switching means and said trunk circuit, said four wires including two talking conductors and two control conductors, and means for extending coin supervision over one of said control conductors, two differential relays, one of said relays being associated with said conversation switching means and the other of said relays being in said trunk circuit, means for connecting one of said control conductors through one winding of each of said differential relays, means for changing the potential on said one control conductor in said trunk circuit, means responsive to said change of potential for controlling the operated state of said one differential relay, and means responsive to said operated state of said one relay for controlling said conversation switch circuit to enable coin control under control of said operator.

4. The telephone system of claim 3, and means in said conversation switching means for returning called line on-hook and off-hook supervision to said trunk circuit over said one control conductor, means responsive to said supervision for selectively operating said other differential relay in said trunk circuit, and means responsive to operation of said other differential relay for repeating said supervision to said operator in said distant exchange.

5. The telephone system of claim 4 and means providing idle line termination for said conversation trunk line, means responsive to an operation of said other differential relay in said trunk circuit for applying and removing said idle line termination in said trunk circuit responsive to said on-hook and off-hook supervision.

6. The telephone system of claim 5 and a busy test relay associated with said conversation switching means, means for operating said busy test relay at one time during the sequence of setting up a call if the called line is busy, means for operating said busy test relay at a different time in the sequence of setting up a call for applying ringing current to said called line, and means for operating said busy test relay at a still different time in the sequence of setting up a call for providing a last party release feature.

7. A telephone system comprising a two-way trunk circuit, an operator's position, a coin control means having access to said trunk circuit, a coin control trunk line interconnecting said operator's position and said switch, means at said operator's position for controlling said coin control means over said coin control trunk line, a conversation circuit, a conversation carrying trunk line, means for seizing said conversation circuit from said trunk circuit on calls which are incoming over said conversation trunk line, said trunk circuit having a single point of access for coin control, means responsive to said control from said operator position for causing said coin control means to seize said point of access, means effective over said coin control trunk line, said coin control means and said point of access for controlling the disposition of coins on both incoming and outgoing calls, said conversation circuit including a connector switch and four-wire means for interconnecting said conversation circuit and said trunk circuit, said four wires including two talking conductors and two control conductors, means for extending coin supervision over one of said control conductors, two differential relays, one of said relays being in said conversation circuit and the other of said relays being in said trunk circuit, means for connecting said one control conductor through one winding of each of said differential relays, means responsive to said operator control for changing the potential on said one control conductor in said trunk circuit, means responsive to said change of potential for controlling the operation of said one differential relay in said conversation circuit, and means responsive to an operation of said one relay for controlling said conversation circuit to complete coin control under control of said operator.

8. The telephone system of claim 7 and means in said conversation circuit for returning called line on-hook and off-hook supervision to said trunk circuit over said one control conductor, means responsive to said supervision for selectively operating said other differential relay in said trunk circuit, and means responsive to operation of said other differential relay for repeating said supervision to said operator in said distant exchange.

9. The telephone system of claim 8 and means providing idle line termination for said conversation trunk line, means responsive to the operated state of said other differential relay in said trunk circuit for applying and removing said idle line termination in said trunk circuit responsive to said on-hook and off-hook supervision.

10. The telephone system of claim 9 and a busy test relay in said conversation circuit, means for operating said busy test relay at one time during the sequence of setting up a call if the called line is busy, means for operating said busy test relay at a different time in the sequence of setting up a call for applying ringing current to said called line, and means for operating said busy test relay at a still different time in the sequence of setting up a call for holding said conversation circuit pending last party release.

References Cited in the file of this patent

UNITED STATES PATENTS

| | | |
|---|---|---|
| 1,799,532 | Ray et al. | Apr. 7, 1931 |
| 2,312,427 | Lomax | Mar. 2, 1943 |
| 2,657,267 | Pharis | Oct. 27, 1953 |
| 2,669,606 | Kessler et al. | Feb. 15, 1954 |